(12) United States Patent
Takagi et al.

(10) Patent No.: US 11,820,199 B2
(45) Date of Patent: Nov. 21, 2023

(54) HEAT EXCHANGER

(71) Applicant: DENSO CORPORATION, Kariya (JP)

(72) Inventors: Yusuke Takagi, Kariya (JP); Kenshiro Muramatsu, Kariya (JP); Isao Tamada, Kariya (JP); Hiroyuki Osakabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 436 days.

(21) Appl. No.: 17/078,419

(22) Filed: Oct. 23, 2020

(65) Prior Publication Data

US 2021/0039470 A1   Feb. 11, 2021

Related U.S. Application Data

(63) Continuation of application No. PCT/JP2019/011948, filed on Mar. 21, 2019.

(30) Foreign Application Priority Data

Apr. 27, 2018 (JP) .................................. 2018-087289

(51) Int. Cl.
  *F25D 17/02* (2006.01)
  *B60H 1/00* (2006.01)
  *B60H 1/32* (2006.01)

(52) U.S. Cl.
  CPC ....... *B60H 1/00278* (2013.01); *B60H 1/3227* (2013.01); *B60H 2001/3291* (2013.01)

(58) Field of Classification Search
  CPC .............. B60H 1/00278; B60H 1/3227; B60H 2001/3291

USPC ........................................................... 62/434
See application file for complete search history.

(56) References Cited

U.S. PATENT DOCUMENTS

| 9,093,729 | B2 | 7/2015 | Wesner et al. |
| 2013/0061630 | A1 | 3/2013 | Schaefer et al. |
| 2014/0013787 | A1 | 1/2014 | Wesner et al. |
| 2015/0276328 | A1 | 10/2015 | Huang et al. |
| 2016/0187067 | A1 | 6/2016 | Kobayashi et al. |

(Continued)

FOREIGN PATENT DOCUMENTS

| CN | 103328914 A | 9/2013 |
| DE | 19828029 A1 | 12/1999 |

(Continued)

*Primary Examiner* — Davis D Hwu
(74) *Attorney, Agent, or Firm* — Harness, Dickey & Pierce, P.L.C.

(57) ABSTRACT

A core part includes plural plates stacked with a gap therebetween so as to form plural refrigerant passages and plural cooling water passages. The refrigerant passages are communicated with each other in a stacking direction of the plates by a refrigerant inlet tank section and a refrigerant outlet tank section distanced from each other. A refrigerant inlet and a refrigerant outlet communicate with the refrigerant inlet tank section and the refrigerant outlet tank section, respectively, and are provided at one end of the core part in the stacking direction. The refrigerant inlet and the refrigerant inlet tank section are communicated with each other by a refrigerant inlet passage. A distance between a center of the refrigerant outlet tank section and a center of the refrigerant outlet is shorter than a distance between a center of the refrigerant inlet tank section and a center of the refrigerant inlet.

11 Claims, 14 Drawing Sheets

(56) References Cited

U.S. PATENT DOCUMENTS

2016/0282053 A1    9/2016   Bardeleben et al.
2020/0208917 A1    7/2020   Kobayashi et al.

FOREIGN PATENT DOCUMENTS

| DE | 112014004486 T5 | | 7/2016 |
|----|-----------------|---|--------|
| JP | 2007023976 A | * | 2/2007 |
| JP | WO2008072730 A1 | * | 6/2008 |
| JP | 2014229480 A | | 12/2014 |
| JP | 2015212604 A | | 11/2015 |
| JP | 2016044896 A | | 4/2016 |
| JP | 2016125686 A | | 7/2016 |
| JP | 2018044710 A | | 3/2018 |

* cited by examiner

HEAT EXCHANGER

CROSS REFERENCE TO RELATED APPLICATION

The present application is a continuation application of International Patent Application No. PCT/JP2019/011948 filed on Mar. 21, 2019, which designated the U.S. and claims the benefit of priority from Japanese Patent Application No. 2018-87289 filed on Apr. 27, 2018. The entire disclosures of all of the above applications are incorporated herein by reference.

TECHNICAL FIELD

The present disclosure relates to a heat exchanger.

BACKGROUND

A battery temperature control system controls the temperature of a battery mounted on a vehicle. The battery is cooled by cooling water flowing through a cooling water circuit. The cooling water that has absorbed heat from the battery is cooled by a radiator, while the cooling water flows through the cooling water circuit. Further, the cooling water is cooled by a heat exchanger that exchanges heat between refrigerant and the cooling water.

SUMMARY

According to one aspect of the present disclosure, a heat exchanger configured to cool cooling water flowing in a cooling water circuit by latent heat of vaporization of refrigerant circulating in a refrigeration cycle includes:
- a core part including a plurality of plates stacked with each other through a gap to form a plurality of refrigerant passages and a plurality of cooling water passages, in which heat is exchanged between the refrigerant flowing through the refrigerant passages and the cooling water flowing through the cooling water passages;
- a refrigerant inlet tank section and a refrigerant outlet tank section distanced from each other, the plurality of refrigerant passages communicating with each other in a stacking direction of the plates;
- a cooling water inlet tank section and a cooling water outlet tank section distanced from each other, the plurality of cooling water passages communicating with each other in the stacking direction;
- a refrigerant inlet and a refrigerant outlet provided at one end of the core part in the stacking direction to communicate with the refrigerant inlet tank section and the refrigerant outlet tank section, respectively; and
- a refrigerant inlet passage communicating the refrigerant inlet and the refrigerant inlet tank section.

A distance between a center of the refrigerant outlet tank section and a center of the refrigerant outlet is shorter than a distance between a center of the refrigerant inlet tank section and a center of the refrigerant inlet.

DETAILED DESCRIPTION

Figure 1:
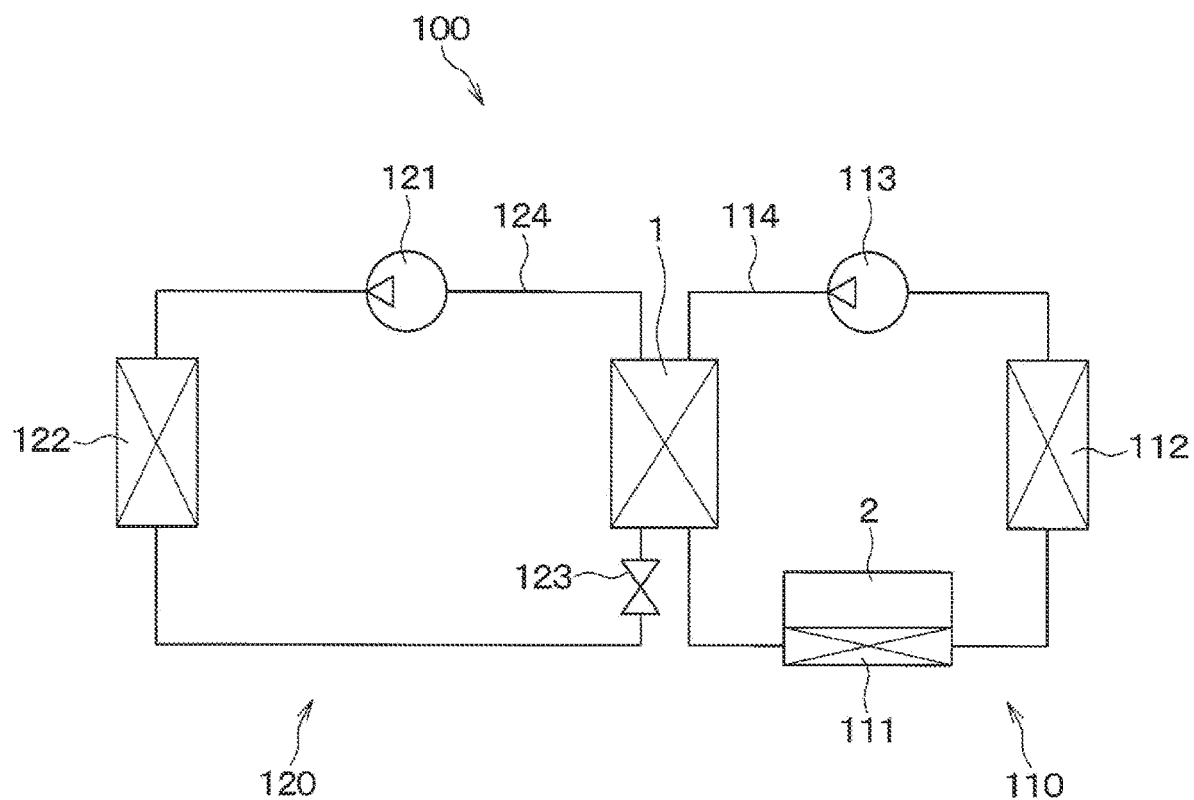
FIG. 1 is a diagram showing a circuit configuration of a battery temperature control device in which a heat exchanger according to a first embodiment is used.

To begin with, examples of relevant techniques will be described.

A battery temperature control system controls the temperature of a battery mounted on a vehicle. This system includes a cooling water circuit in which cooling water circulates and a refrigeration cycle in which a refrigerant circulates. The battery mounted on the vehicle is cooled by the cooling water flowing through the cooling water circuit. The cooling water that has absorbed heat from the battery is cooled by a radiator that exchanges heat between the outside air and the cooling water, while the cooling water flows through the cooling water circuit. Further, the cooling water is cooled by a heat exchanger that exchanges heat between the refrigerant circulating in the refrigeration cycle and the cooling water.

A stacked heat exchanger performs heat exchange between cooling water and refrigerant. The heat exchanger is a condenser in which heat is exchanged between high-temperature high-pressure refrigerant flowing through a heat pump refrigeration cycle and cooling water to heat the cooling water and to condense the refrigerant. The cooling water heated by this heat exchanger (that is, hot water) is used for heating the cabin.

The heat exchanger is a stacked heat exchanger in which plural plates are stacked with a predetermined gap to form refrigerant passages and cooling water passages. When this heat exchanger is viewed from the stacking direction, a refrigerant inlet tank and a refrigerant outlet tank are arranged respectively at corners on a diagonal line, to communicate the plural refrigerant passages with each other. Further, a cooling water inlet tank and a cooling water outlet tank are arranged respectively at corners on the other diagonal line, to communicate the plural cooling water passages with each other. This heat exchanger has a connector to be connected to a piping of the refrigeration cycle at one end in the stacking direction. The connector has a refrigerant inlet to which the refrigerant is supplied and a refrigerant outlet from which the refrigerant flows out. The connector is provided on the cooling water inlet tank so that the cooling water inlet tank and the refrigerant inlet communicate with each other linearly. The cooling water outlet tank and the refrigerant outlet are in communication with each other through a refrigerant return passage provided at one end of the heat exchanger in the stacking direction. Since the heat exchanger includes the connector integrally having the refrigerant inlet and the refrigerant outlet, the heat exchanger can be connected to a component of the refrigeration cycle in a space-saving manner.

In the battery temperature control system, it is desirable that the refrigerant inlet and the refrigerant outlet are located close to each other in the heat exchanger for exchanging heat between the refrigerant circulating in the refrigeration cycle and the cooling water, so as to be connected to a component of the refrigeration cycle in a space-saving manner. However, there are the following issues regarding this heat exchanger.

In the heat exchanger, all the refrigerant passing through the inside thereof flows through the refrigerant return passage that communicates the refrigerant outlet tank section and the refrigerant outlet. Therefore, the pressure loss of the refrigerant in the refrigerant return passage is large. If the configuration of the heat exchanger is applied to the heat exchanger that cools the cooling water by the latent heat of vaporization of the refrigerant, the pressure and the temperature of refrigerant flowing through the refrigerant passage of the core part are raised due to the increase in pressure loss in the refrigerant return passage. As a result, the performance of the heat exchanger that cools the cooling water deteriorates.

The present disclosure provides a heat exchanger in which a refrigerant inlet and a refrigerant outlet are arranged close to each other and a decrease in the ability to cool the cooling water is restricted.

According to one aspect of the present disclosure, a heat exchanger configured to cool cooling water flowing in a cooling water circuit by latent heat of vaporization of refrigerant circulating in a refrigeration cycle includes:
 a core part including a plurality of plates stacked with each other through a gap to form a plurality of refrigerant passages and a plurality of cooling water passages, in which heat is exchanged between the refrigerant flowing through the refrigerant passages and the cooling water flowing through the cooling water passages;
 a refrigerant inlet tank section and a refrigerant outlet tank section distanced from each other, the plurality of refrigerant passages communicating with each other in a stacking direction of the plates;
 a cooling water inlet tank section and a cooling water outlet tank section distanced from each other, the plurality of cooling water passages communicating with each other in the stacking direction;
 a refrigerant inlet and a refrigerant outlet provided at one end of the core part in the stacking direction to communicate with the refrigerant inlet tank section and the refrigerant outlet tank section, respectively; and
 a refrigerant inlet passage communicating the refrigerant inlet and the refrigerant inlet tank section.

A distance between a center of the refrigerant outlet tank section and a center of the refrigerant outlet is shorter than a distance between a center of the refrigerant inlet tank section and a center of the refrigerant inlet.

Accordingly, the refrigerant inlet and the refrigerant outlet can be arranged close to each other due to the refrigerant inlet passage that connects the refrigerant inlet and the refrigerant inlet tank section. Therefore, a component of the refrigeration cycle can be easily connected to the refrigerant inlet and the refrigerant outlet in a space-saving manner.

Since all the refrigerant passing through the inside of the heat exchanger flows through the refrigerant inlet tank section, the refrigerant inlet, and the refrigerant inlet passage, and flows through the refrigerant outlet tank section and the refrigerant outlet, there is concern that the pressure loss will increase.

Therefore, in this heat exchanger, the distance between the center of the refrigerant outlet tank section and the center of the refrigerant outlet is set shorter than the distance between the center of the refrigerant inlet tank section and the center of the refrigerant inlet. As a result, the pressure loss of the refrigerant flowing through the refrigerant outlet tank section and the refrigerant outlet is smaller than the pressure loss of the refrigerant flowing through the refrigerant inlet passage. Therefore, the pressure and the temperature of refrigerant flowing through the refrigerant passage of the core part can be restricted from increasing by pressure loss of the refrigerant flowing from the refrigerant outlet tank section to the refrigerant outlet. Thus, even when the refrigerant inlet and the refrigerant outlet are arranged close to each other, the ability to cool the cooling water can be restricted from decreasing.

In this specification, the distance between the center of the refrigerant outlet tank section and the center of the refrigerant outlet includes zero.

Since the heat exchanger cools the cooling water by the latent heat of vaporization of the refrigerant, an expansion valve is provided upstream of the refrigerant inlet to decompress and expand the high-pressure refrigerant flowing through the refrigeration cycle. Therefore, the pressure of the refrigerant flowing through the refrigerant passage of the core part is reduced by the expansion valve and the refrigerant inlet passage. Thus, the pressure reduction of the refrigerant through the refrigerant inlet passage does not reduce the ability of the heat exchanger to cool the cooling water.

Further, the refrigerant flowing through the heat exchanger goes from the refrigerant inlet toward the refrigerant outlet, and changes from the gas-liquid two-phase state to the complete gas state. Since the volume of the refrigerant is increased, the flow velocity is faster at the refrigerant outlet than the refrigerant inlet. In this heat exchanger, since the pressure loss of the refrigerant flowing through the refrigerant outlet tank section and the refrigerant outlet is small, the decrease in the flow rate of the refrigerant on the refrigerant outlet side is suppressed. Therefore, a decrease in the ability of the heat exchanger to cool the cooling water can be restricted, while the refrigerant inlet and the refrigerant outlet can be arranged close to each other.

The reference numerals in parentheses attached to the components and the like indicate an example of correspondence with the specific components and the like described in embodiments to be described below.

Embodiments of the present disclosure will now be described with reference to the drawings. Parts that are identical or equivalent to each other in the following embodiments are assigned the same reference numerals and will not be described.

First Embodiment

A first embodiment will be described with reference to the drawings. A heat exchanger 1 of this embodiment is used in a battery temperature control system 100 that controls the temperature of a battery mounted on a vehicle. The battery temperature control system 100 is installed in an electric vehicle, a hybrid vehicle, or the like, and is used for cooling a battery 2 for driving a motor of a vehicle.

First, the battery temperature control system 100 will be described. As shown in FIG. 1, the battery temperature control system 100 includes a cooling water circuit 110 in which cooling water such as water or antifreeze circulates, and a refrigeration cycle 120 in which refrigerant circulates. The refrigerant circulating in the refrigeration cycle 120 is, for example, R-1234yf or the like.

The cooling water circuit 110 includes a cooler 111, a radiator 112, a water pump 113, and the heat exchanger 1 of this embodiment, which are connected in an annular shape by a cooling water pipe 114. The cooler 111 is a water-cooled heat exchanger that exchanges heat between the battery 2 and cooling water. The heat generated from the battery 2 is absorbed by the cooling water. The radiator 112 is an air-cooled heat exchanger that exchanges heat between outside air and cooling water. The cooling water flowing through the radiator 112 is cooled by radiating heat to the outside air. The water pump 113 circulates the cooling water in the cooling water circuit 110. The heat exchanger of the present embodiment is a water-refrigerant heat exchanger that exchanges heat between the cooling water circulating in the cooling water circuit 110 and the refrigerant circulating in the refrigeration cycle 120.

The refrigeration cycle 120 includes a compressor 121, a condenser 122, an expansion valve 123, and the heat exchanger 1 of the present embodiment, which are connected in an annular shape by a refrigerant pipe 124. The compressor 121 compresses the refrigerant sucked from the refrigerant pipe 124 connected to the heat exchanger 1 of the present embodiment, and discharges the compressed high temperature and high pressure refrigerant toward the condenser 122. The condenser 122 is an air-cooled heat exchanger that exchanges heat between the refrigerant discharged from the compressor 121 and the outside air. The refrigerant flowing through the condenser 122 radiates heat to the outside air to be condensed.

The expansion valve 123 is a fixed throttle such as orifice or nozzle for decompressing and expanding the refrigerant, or an appropriate variable throttle. The liquid-phase refrigerant condensed in the condenser 122 is decompressed when passing through the expansion valve 123, and mist-like gas-liquid two-phase refrigerant flows into the heat exchanger 1 of the present embodiment. The refrigerant flowing through the heat exchanger 1 of the present embodiment absorbs heat from the cooling water to evaporate, and flows out toward the compressor 121. The cooling water flowing through the heat exchanger 1 of this embodiment is cooled by the latent heat of vaporization of the refrigerant.

In this way, the battery temperature control system 100 cools the battery 2 mounted on the vehicle with the cooling water flowing through the cooler 111 of the cooling water circuit 110. The cooling water that has absorbed heat from the battery 2 in the cooler 111 is cooled by the radiator 112 and the heat exchanger 1 of the present embodiment when flowing through the cooling water circuit 110. Therefore, the heat exchanger 1 of the present embodiment is a water-refrigerant heat exchanger that cools the cooling water flowing through the cooling water circuit 110 by the latent heat of vaporization of the refrigerant circulating in the refrigeration cycle 120. In other words, the heat exchanger 1 of the present embodiment is an evaporator that is arranged downstream of the expansion valve 123 of the refrigeration cycle 120 and upstream of the compressor 121.

Figure 2:
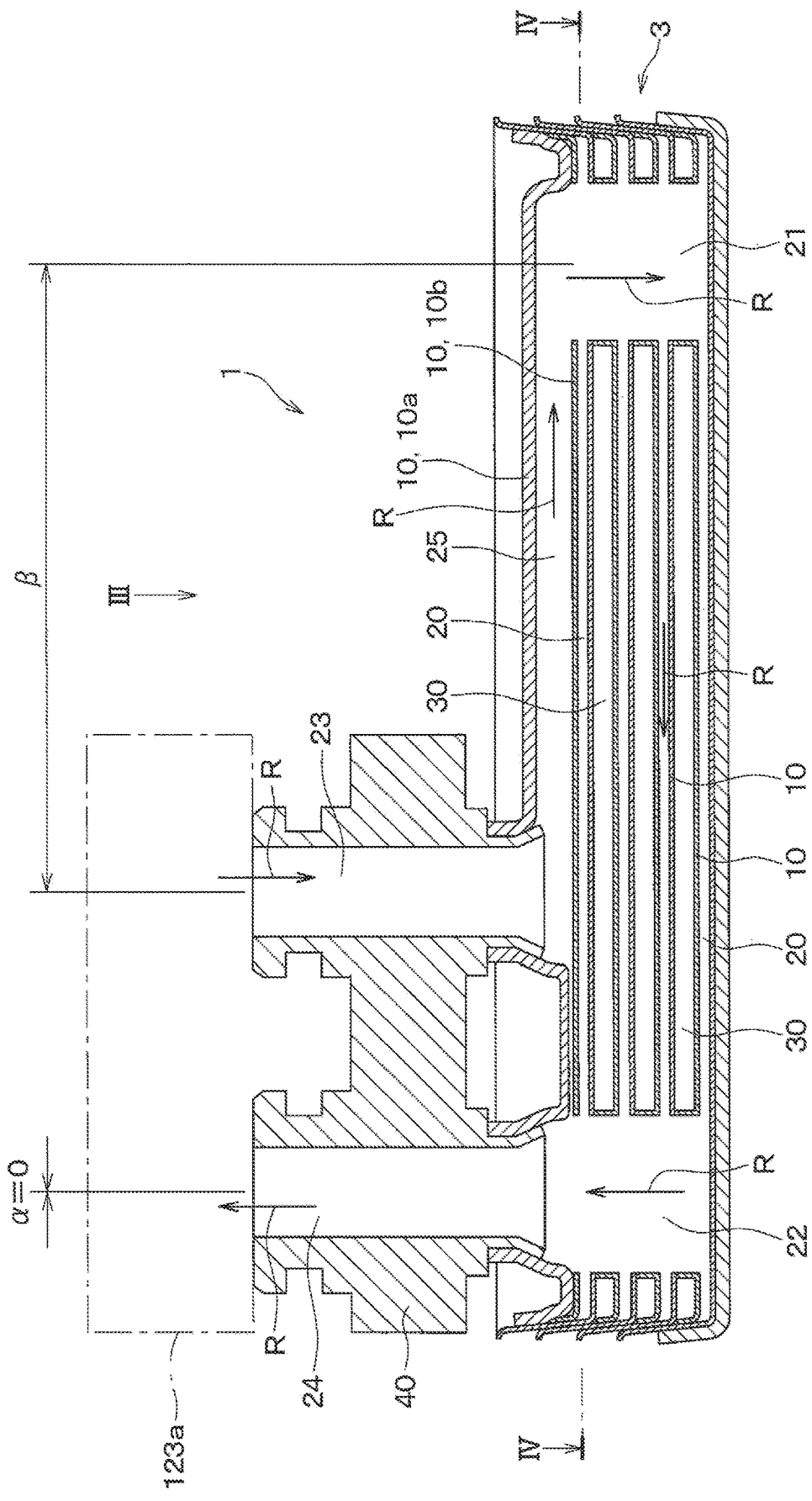
FIG. 2 is a cross-sectional view of the heat exchanger according to the first embodiment.
Figure 3:
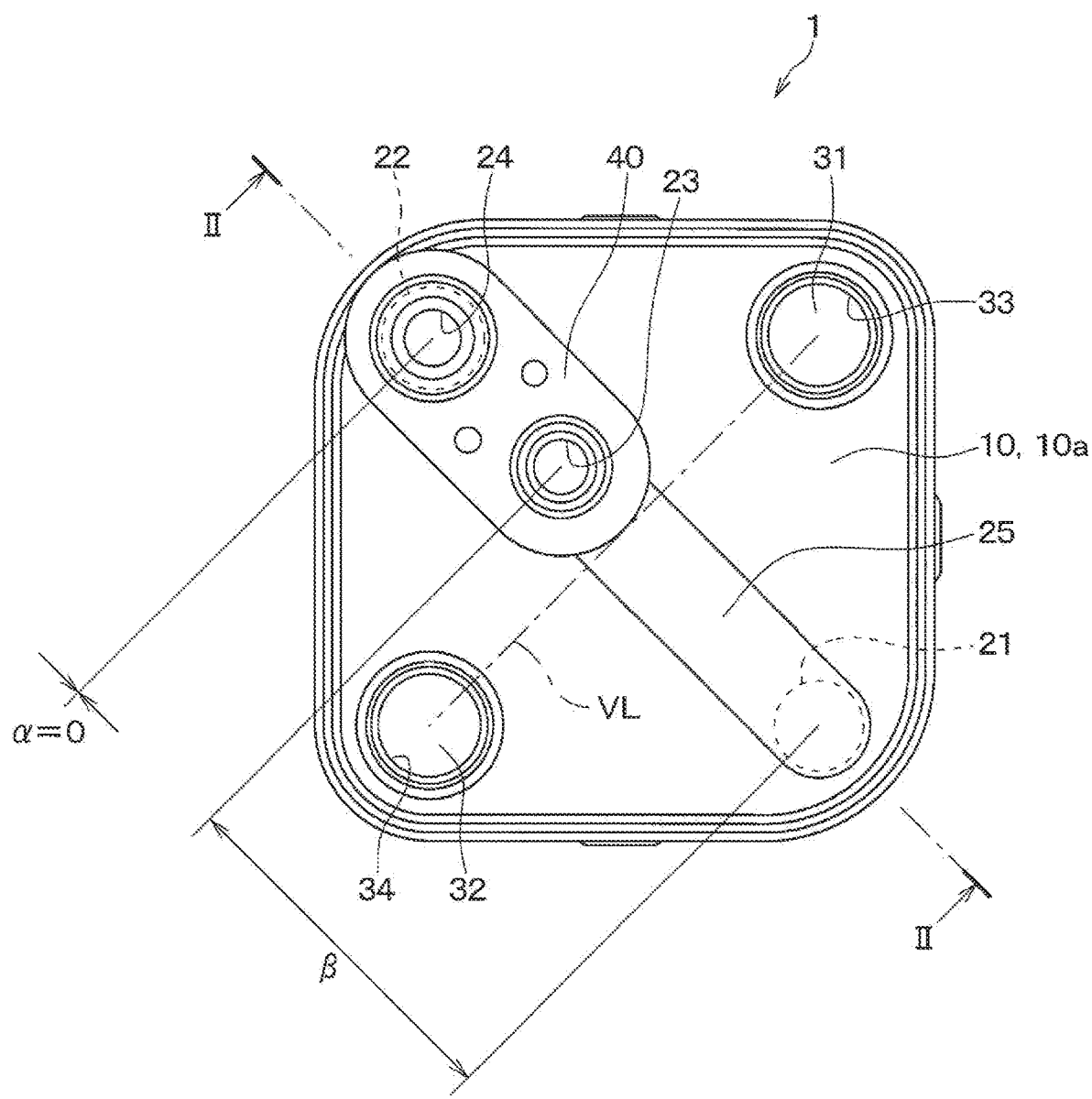
FIG. 3 is a plan view of the heat exchanger viewed in III direction of FIG. 2.
Figure 4:
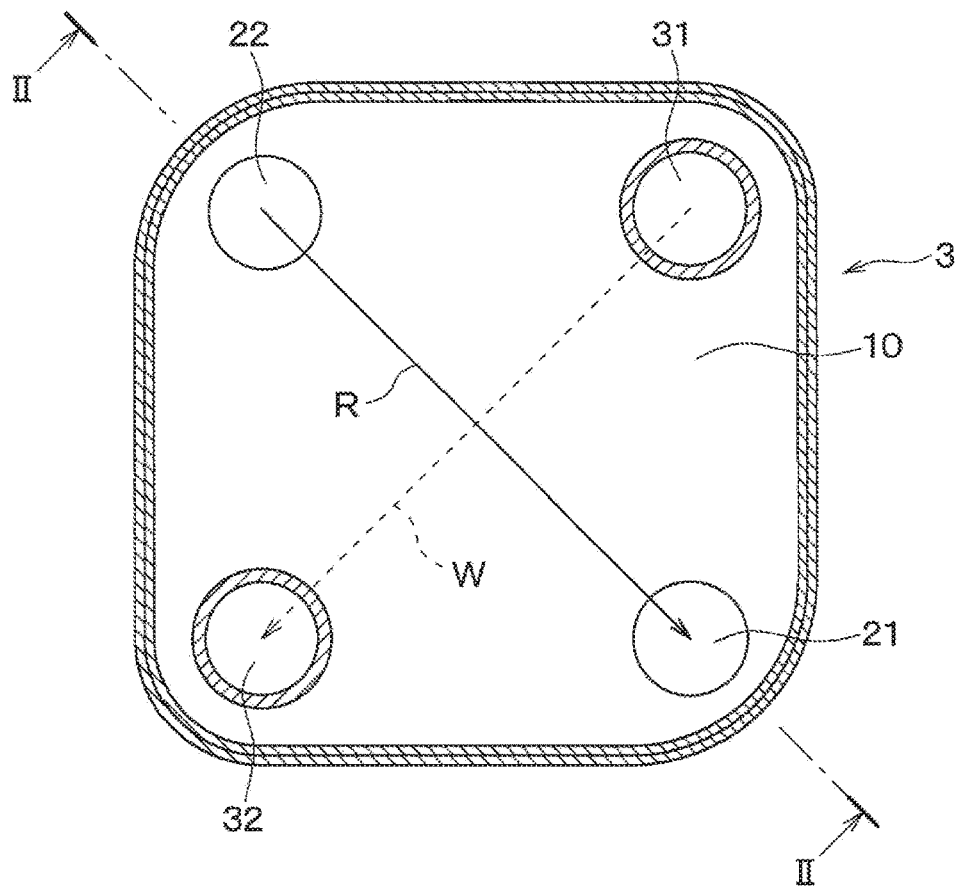
FIG. 4 is a cross-sectional view taken along IV-IV line of FIG. 2.

Next, the heat exchanger 1 of this embodiment will be described. As shown in FIGS. 2 to 4, the heat exchanger 1 according to the present embodiment has a core part 3, a refrigerant inlet tank section 21, a refrigerant outlet tank section 22, a cooling water inlet tank section 31, a cooling water outlet tank section 32, a refrigerant inlet 23, a refrigerant outlet 24, a connector 40, and a refrigerant inlet passage 25.

The core part 3 is configured by stacking plural plates 10 with a predetermined gap therebetween. The plural plates 10 are stacked in the stacking direction. Plural refrigerant passages 20 and plural cooling water passages 30 are alternately formed by the gap between the plates 10 in the stacking direction. The number of the refrigerant passages 20 and the number of the cooling water passages 30 are arbitrarily set depending on the cooling performance required for the heat exchanger 1. The refrigerant flowing through the refrigerant passages 20 and the cooling water flowing through the cooling water passages 30 exchange heat via the plate 10. That is, heat is exchanged between the refrigerant and the cooling water in the core part 3.

The core part 3 is formed in a substantially rectangular shape as viewed from the stacking direction, and the outer edges of the four corners are formed in arc shape. The refrigerant inlet tank section 21, the refrigerant outlet tank section 22, the cooling water inlet tank section 31, and the cooling water outlet tank section 32 are formed at the four corners of the core part 3, respectively.

The refrigerant inlet tank section 21 and the refrigerant outlet tank section 22 connect the refrigerant passages 20 with each other in the stacking direction in the core part 3. The refrigerant inlet tank section 21 and the refrigerant outlet tank section 22 are provided in the core part 3 to be distanced from each other. Specifically, the refrigerant inlet tank section 21 and the refrigerant outlet tank section 22 are respectively arranged at one corner and the other corner of the diagonal line when the core part 3 is viewed from the stacking direction. This makes it possible to increase the distance between the refrigerant inlet tank section 21 and the refrigerant outlet tank section 22.

The refrigerant inlet tank section 21 communicates with the refrigerant inlet 23 via the refrigerant inlet passage 25. The refrigerant outlet tank section 22 communicates with the refrigerant outlet 24. The refrigerant flows through the refrigerant inlet 23 from the refrigeration cycle 120 into the heat exchanger 1. The refrigerant inlet passage 25 connects the refrigerant inlet 23 to the refrigerant inlet tank section 21. The refrigerant inlet passage 25 is provided at one end of the core part 3 in the stacking direction. Specifically, the refrigerant inlet passage 25 is defined between an outermost end plate 10a of the of plates 10 provided at one end in the stacking direction and an adjacent plate 10b adjacent to the outermost end plate 10a in the stacking direction. The refrigerant flows through the refrigerant outlet 24 from the heat exchanger 1 to the refrigeration cycle 120.

As a result, as shown by the solid arrow R in FIG. 2 and the solid arrow R in FIG. 4, after the refrigerant supplied to the refrigerant inlet 23 flows into the refrigerant inlet tank section 21 via the refrigerant inlet passage 25, the refrigerant flows through the refrigerant passages 20. Then, the refrigerant flowing through the refrigerant passages 20 is collected in the refrigerant outlet tank section 22 and then flows out from the refrigerant outlet 24.

The cooling water inlet tank section 31 and the cooling water outlet tank section 32 connect the cooling water passages 30 with each other in the stacking direction, in the core part 3. The cooling water inlet tank section 31 and the cooling water outlet tank section 32 are provided in the core part 3 to be distanced from each other. Specifically, the cooling water inlet tank section 31 and the cooling water outlet tank section 32 are arranged at one corner and the other corner on a diagonal line different from the diagonal line on which the refrigerant inlet tank section 21 and the refrigerant outlet tank section 22 are arranged, in the core part 3 viewed from the stacking direction. As a result, the distance between the cooling water inlet tank section 31 and the cooling water outlet tank section 32 can be increased.

The cooling water inlet tank section 31 communicates with the cooling water inlet 33. The cooling water outlet tank section 32 communicates with the cooling water outlet 34. The cooling water flows into the heat exchanger 1 through the cooling water inlet 33 from the cooling water circuit 110. The cooling water flows out of the heat exchanger 1 to the cooling water circuit 110 through the cooling water outlet 34. The cooling water supplied to the cooling water inlet 33 flows into the cooling water inlet tank section 31 and then flows through the cooling water passages 30 as indicated by the broken arrow W in FIG. 4. Then, the cooling water that has flowed through the cooling water passages 30 is collected in the cooling water outlet tank section 32, and then flows out of the cooling water outlet 34.

It is possible to increase the distance between the refrigerant inlet tank section 21 and the refrigerant outlet tank section 22 by disposing the refrigerant inlet tank section 21 and the refrigerant outlet tank section 22 respectively at corners on a diagonal line of the core part 3 viewed from the stacking direction. Further, it is possible to increase the distance between the cooling water inlet tank section 31 and the cooling water outlet tank section 32 by disposing the cooling water inlet tank section 31 and the cooling water outlet tank section 32 respectively at corners on another diagonal line different from the above-described diagonal line. Thereby, it is possible to improve the heat exchange efficiency between the refrigerant flowing through the refrigerant passages 20 and the cooling water flowing through the cooling water passages 30 in the core part 3.

In the present embodiment, both the refrigerant inlet 23 and the refrigerant outlet 24 are provided at one end of the core part 3 in the stacking direction. Specifically, both the refrigerant inlet 23 and the refrigerant outlet 24 are provided in the connector 40 formed as one-piece component. Therefore, the refrigerant inlet 23 and the refrigerant outlet 24 are relatively close to each other, compared with the refrigerant inlet tank section 21 and the refrigerant outlet tank section 22 arranged at corners of the diagonal of the core part 3. As a result, in the heat exchanger 1 of the present embodiment, a component of the refrigeration cycle 120 can be connected to the refrigerant inlet 23 and the refrigerant outlet 24 in a space-saving manner.

A component of the refrigeration cycle 120 connected to the connector 40 is, for example, an integrated thermal expansion valve 123a integrally including a temperature detector and a passage adjustment unit. The integrated thermal expansion valve 123a is configured such that the temperature detector detects the temperature of refrigerant flowing out of the refrigerant outlet 24 and that the passage adjustment unit automatically adjust the passage area in response to the detected refrigerant temperature. In that case, the refrigerant outlet 24 and the temperature detector are connected, and the refrigerant inlet 23 and the passage adjustment unit are connected. In this embodiment, since the refrigerant inlet 23 and the refrigerant outlet 24 are provided in the connector 40, it is possible to reduce the manufacturing tolerance regarding the positions of the refrigerant inlet 23 and the refrigerant outlet 24. Therefore, the connector 40 and the integrated thermal expansion valve 123a can be easily connected.

The component of the refrigeration cycle 120 connected to the connector 40 is not limited to the integrated thermal expansion valve 123a. The component of the refrigeration cycle 120 may be, for example, a thermal expansion valve in which the temperature detector and the passage adjustment unit are configured as separate members, an electronically controlled expansion valve, or the refrigerant pipe 124 of the refrigeration cycle 120. The heat exchanger 1 of the present embodiment functions as an evaporator of the refrigeration cycle 120, and the passage adjustment unit of the expansion valve 123 of the refrigeration cycle 120 is provided upstream of the refrigerant inlet 23.

The connector 40 is provided at a position closer to the refrigerant outlet tank section 22 than the refrigerant inlet tank section 21 in one end of the core part 3 in the stacking direction. Specifically, the connector 40 is arranged such that the center-to-center distance α between the refrigerant outlet tank section 22 and the refrigerant outlet 24 is shorter than the center-to-center distance β between the refrigerant inlet tank section 21 and the refrigerant inlet 23. In the present embodiment, the center-to-center distance α between the refrigerant outlet tank section 22 and the refrigerant outlet 24 is zero.

Further, the connector 40 is arranged in an area adjacent to the refrigerant outlet tank section 22, with respect to a line VL connecting the center of the cooling water inlet tank section 31 and the center of the cooling water outlet tank section 32. Therefore, both the refrigerant inlet 23 and the refrigerant outlet 24 are located in the area adjacent to the refrigerant outlet tank section 22 with respect to the line VL connecting the center of the cooling water inlet tank section 31 and the center of the cooling water outlet tank section 32.

In the present embodiment, the connector 40 is provided so that the refrigerant outlet 24 is located directly above the refrigerant outlet tank section 22. Therefore, the refrigerant outlet 24 and the refrigerant outlet tank section 22 communicate with each other in a straight line shape without extreme bending. However, the arrangement of the connector 40 is not limited to the form in which the refrigerant outlet 24 is located immediately above the refrigerant outlet tank section 22. That is, the refrigerant outlet 24 and the refrigerant outlet tank section 22 may be deviated from each other if the center-to-center distance α between the refrigerant outlet tank section 22 and the refrigerant outlet 24 is shorter than the center-to-center distance β between the refrigerant inlet tank section 21 and the refrigerant inlet 23. That is, $\alpha \leq 0$ may be satisfied.

In the heat exchanger 1 of the present embodiment, since the connector 40 is arranged at the position described above, the refrigerant inlet 23 and the refrigerant inlet tank section 21 are separated from each other. Therefore, the heat exchanger 1 of the present embodiment includes the refrigerant inlet passage 25 that connects the refrigerant inlet 23 and the refrigerant inlet tank section 21.

All the refrigerant passing through the inside of the heat exchanger 1 flows through the refrigerant inlet passage 25. Therefore, in the heat exchanger 1 of the present embodiment, there is a concern that the pressure loss of the refrigerant increases at the refrigerant inlet passage 25. If the position of the connector 40 is slightly changed from the positions in FIGS. 2 and 3 such that the refrigerant outlet 24 and the refrigerant outlet tank section 22 are deviated from each other, the pressure loss of the refrigerant may occur even in a passage communicating with the refrigerant outlet tank section 22 and the refrigerant outlet 24. Therefore, in the heat exchanger 1 of the present embodiment, the center-to-center distance α between the refrigerant outlet tank section 22 and the refrigerant outlet 24 is set shorter than the center-to-center distance β between the refrigerant inlet tank section 21 and the refrigerant inlet 23.

The reasons are described below, why the center-to-center distance α between the refrigerant outlet tank section 22 and the refrigerant outlet 24 is set shorter than the center-to-center distance β between the refrigerant inlet tank section 21 and the refrigerant inlet 23 in the heat exchanger 1 of the present embodiment.

Figure 5:
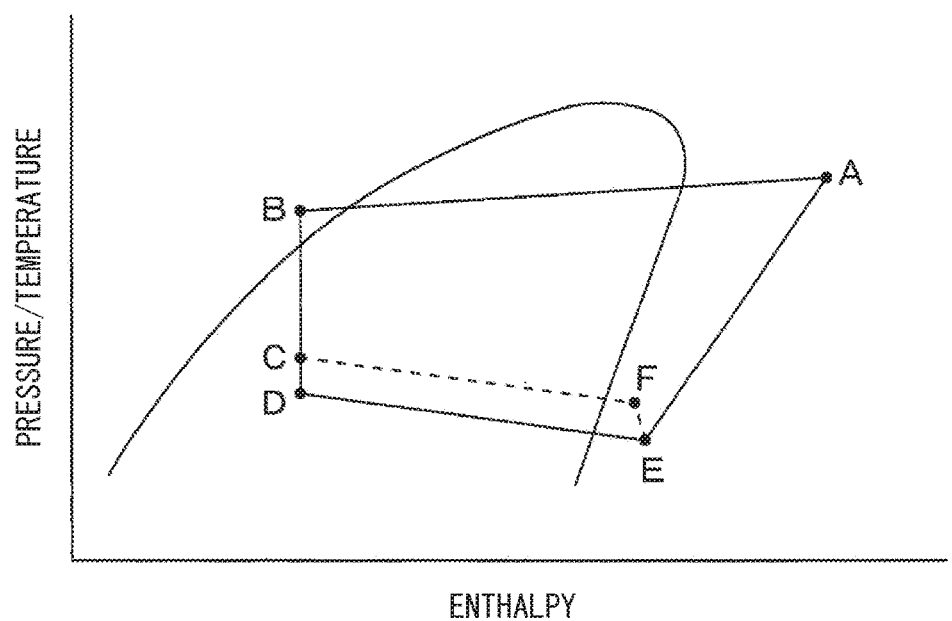
FIG. 5 is a Mollier diagram showing the behavior of refrigerant circulating in a refrigeration cycle in which the heat exchanger according to the first embodiment is installed.

A solid line connecting points A to E in FIG. 5 is a Mollier diagram showing the behavior of the refrigerant circulating in the refrigeration cycle 120 in which the heat exchanger 1 of the present embodiment is installed.

The point A shows the state of the refrigerant discharged from the discharge port of the compressor 121, that is, the state of the refrigerant flowing into the condenser 122. The point B shows the state of the refrigerant flowing out from the condenser 122, that is, the state of the refrigerant flowing into the expansion valve 123. The point C indicates the state of the refrigerant flowing out from the expansion valve 123, that is, the state of the refrigerant flowing into the refrigerant inlet 23 of the heat exchanger 1 of the present embodiment. The point D shows the state of the refrigerant flowing from the refrigerant inlet passage 25 into the refrigerant inlet tank section 21 in the heat exchanger 1 of the present embodiment. The point E indicates the state of the refrigerant flowing out from the refrigerant outlet 24 of the heat exchanger 1 of this embodiment. That is, the refrigerant flowing through the heat exchanger 1 of the present embodiment flows through the refrigerant inlet passage 25 between the points C and D. Further, the refrigerant flows through the refrigerant inlet tank section 21, the refrigerant passage 20 of the core part 3, and the refrigerant outlet tank section 22 between the points D and E.

As described above, in the heat exchanger 1 of the present embodiment, the pressure pf refrigerant flowing through the refrigerant passage 20 of the core part 3 is reduced by the expansion valve 123 and the refrigerant inlet passage 25. Therefore, in the heat exchanger 1 of the present embodiment, while the pressure of the refrigerant is lowered through the refrigerant inlet passage 25, the ability of the refrigerant flowing through the refrigerant passage 20 of the core part 3 to cool the cooling water is not lowered.

Further, the refrigerant flowing through the heat exchanger 1 moves from the refrigerant inlet 23 to the refrigerant outlet 24 and is transformed from the gas-liquid two-phase state to the complete gas state. Since the volume of the refrigerant is increased, the flow velocity of refrigerant becomes faster at the refrigerant outlet 24 than at the refrigerant inlet 23. In this regard, in the heat exchanger 1 of the present embodiment, since the pressure loss of the refrigerant flowing through the refrigerant outlet tank section 22 and the refrigerant outlet 24 is small, the decrease in the flow rate of the refrigerant on the refrigerant outlet 24 is suppressed. Therefore, the ability of the heat exchanger 1 to cool the cooling water can be restricted from decreasing when the refrigerant inlet 23 and the refrigerant outlet 24 are arranged close to each other.

Figure 16:
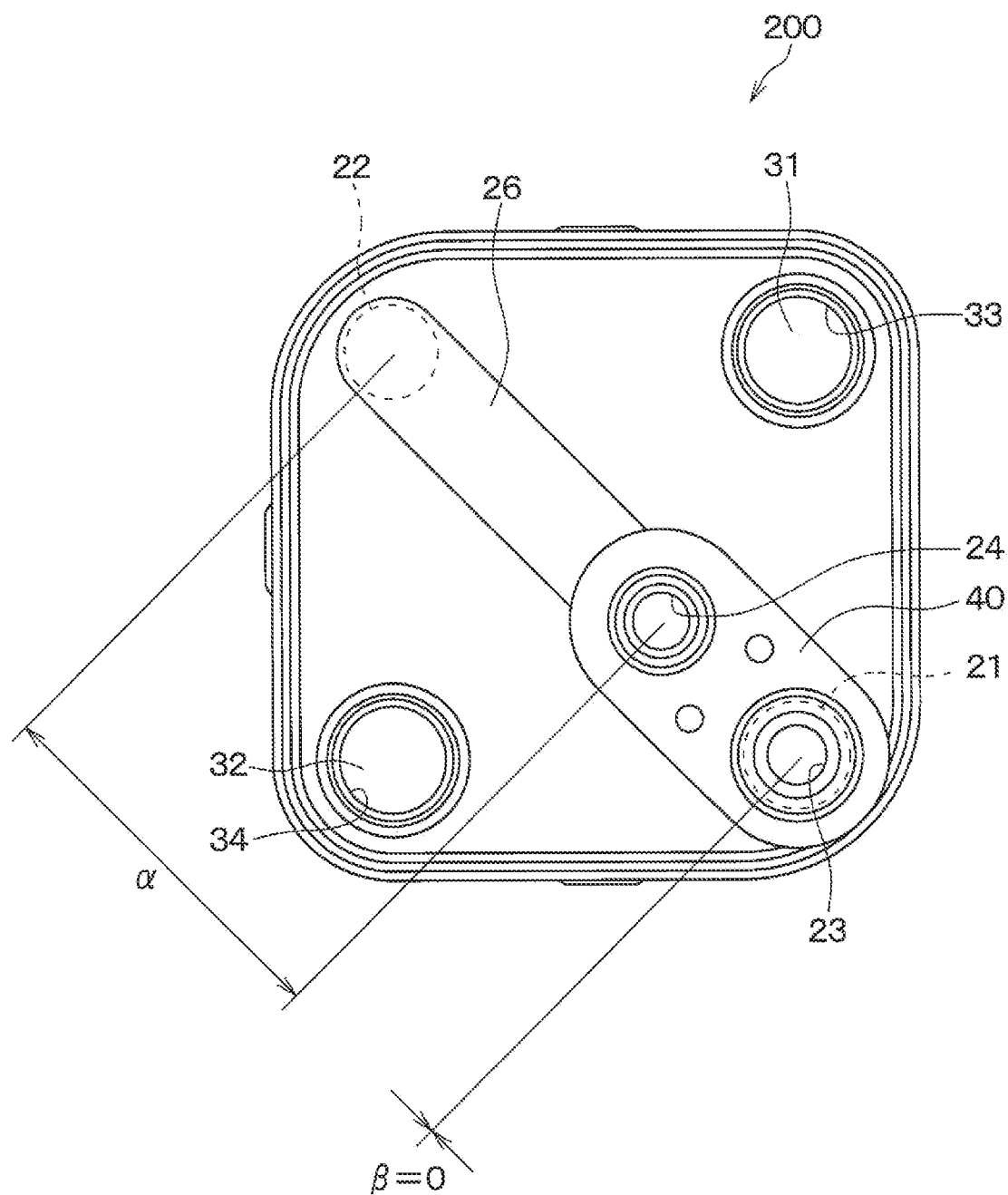
FIG. 16 is a plan view of a heat exchanger of a comparative example.

For comparison with the heat exchanger 1 of the present embodiment described above, a heat exchanger 200 of a comparative example will be described. As shown in FIG. 16, in the heat exchanger 200 of the comparative example, the center-to-center distance β between the refrigerant inlet tank section 21 and the refrigerant inlet 23 is set to 0, such that the refrigerant outlet tank section 22 and the refrigerant outlet 24 are communicated with each other by a refrigerant return passage 26. That is, in the heat exchanger 200 of the comparative example, the center-to-center distance α between the refrigerant outlet tank section 22 and the refrigerant outlet 24 is made longer than the center-to-center distance β between the refrigerant inlet tank section 21 and the refrigerant inlet 23.

A broken line connecting the points C, F, and E in FIG. 5 represents the behavior of the refrigerant flowing through the heat exchanger 200 of the comparative example in the Mollier diagram. In this broken line, the point F indicates the state of the refrigerant flowing from the refrigerant outlet tank section 22 into the refrigerant return passage 26 in the heat exchanger 200 of the comparative example. That is, the refrigerant flowing through the heat exchanger 200 of the comparative example flows from the refrigerant inlet 23 to the refrigerant inlet tank section 21, the refrigerant passage 20 of the core part 3, and the refrigerant outlet tank section 22 between the points C and F. In addition, the refrigerant flows through the refrigerant return passage 26 between the points F and E.

As described above, in the heat exchanger 200 of the comparative example, the pressure and the temperature of refrigerant flowing through the refrigerant passage 20 of the core part 3 is raised by the pressure loss of the refrigerant flowing through the refrigerant return passage 26. Therefore, in the heat exchanger 200 of the comparative example, the ability of cooling the cooling water by the refrigerant flowing through the refrigerant passage 20 of the core part 3 is reduced.

In contrast to the heat exchanger 200 of the comparative example, the heat exchanger 1 of this embodiment has the following effects.

(1) In the heat exchanger 1 of the present embodiment, the center-to-center distance α between the refrigerant outlet tank section 22 and the refrigerant outlet 24 is shorter than the center-to-center distance β between the refrigerant inlet tank section 21 and the refrigerant inlet 23. As a result, the pressure loss of the refrigerant flowing through the refrigerant outlet tank section 22 and the refrigerant outlet 24 is smaller than the pressure loss of the refrigerant flowing through the refrigerant inlet passage 25 that connects the refrigerant inlet tank section 21 and the refrigerant inlet 23. Therefore, it is possible to restrict the pressure and the temperature of the refrigerant flowing through the refrigerant passage 20 of the core part 3 from increasing due to the pressure loss of the refrigerant flowing through the refrigerant outlet tank section 22 and the refrigerant outlet 24. Therefore, the ability to cool the cooling water by the heat exchanger 1 of the present embodiment can be restricted from decreasing even when the refrigerant inlet 23 and the refrigerant outlet 24 are arranged close to each other.

(2) Further, in the heat exchanger 1 of the present embodiment, the pressure of the refrigerant flowing through the refrigerant passage 20 of the core part 3 is reduced by the expansion valve 123 and the refrigerant inlet passage 25 arranged upstream of the refrigerant inlet 23. Therefore, the ability to cool the cooling water in the heat exchanger 1 is not reduced by the reduction in the pressure of the refrigerant by the refrigerant inlet passage 25.

(3) Further, in the heat exchanger 1 of the present embodiment, the pressure loss of the refrigerant flowing through the refrigerant outlet tank section 22 and the refrigerant outlet 24 is small, so that the flow rate of the refrigerant is suppressed from decreasing at the refrigerant outlet 24. Therefore, it is possible to arrange the refrigerant inlet 23 and the refrigerant outlet 24 close to each other in this heat exchanger 1 while restricting a decrease in the ability to cool the cooling water.

(4) The heat exchanger 1 of the present embodiment includes the refrigerant inlet passage 25 that connects the refrigerant inlet 23 and the refrigerant inlet tank section 21. This allows the refrigerant inlet 23 and the refrigerant outlet 24 to be arranged close to each other. Therefore, in this heat exchanger 1, a component of the refrigeration cycle 120 can be easily connected to the refrigerant inlet 23 and the refrigerant outlet 24 in a space-saving manner.

(5) The expansion valve 123 is provided upstream of the refrigerant inlet 23 in the heat exchanger 1 of the present embodiment to decompress and expand the high-pressure refrigerant flowing through the refrigeration cycle 120. As a result, the heat exchanger 1 functions as an evaporator of the refrigeration cycle 120.

(6) In the heat exchanger 1 of the present embodiment, the refrigerant outlet 24 and the refrigerant outlet tank section 22 communicate with each other in a straight line without making an extreme bend. Thereby, the pressure loss of the refrigerant flowing from the refrigerant outlet tank section 22 to the refrigerant outlet 24 can be reduced. Therefore, it is possible to restrict the pressure and the temperature of refrigerant flowing in the refrigerant passage 20 of the core part 3 from increasing due to the pressure loss of the refrigerant flowing from the refrigerant outlet tank section 22 to the refrigerant outlet 24. Further, it is possible to suppress a decrease in the flow rate of the refrigerant flowing through the heat exchanger 1.

(7) In the heat exchanger 1 of the present embodiment, the refrigerant outlet 24 and the refrigerant inlet 23 are provided in the area adjacent to the refrigerant outlet tank section 22 with respect to the line VL that connects the center of the cooling water inlet tank section 31 and the center of the cooling water outlet tank section 32. This allows the refrigerant inlet 23 and the refrigerant outlet 24 to be arranged close to each other. Therefore, in this heat exchanger 1, a component of the refrigeration cycle 120 can be easily connected to the refrigerant inlet 23 and the refrigerant outlet 24 in a space-saving manner.

(8) In this embodiment, the refrigerant inlet 23 and the refrigerant outlet 24 are provided in the connector 40. Accordingly, it is possible to reduce the manufacturing tolerance regarding the positions of the refrigerant inlet 23 and the refrigerant outlet 24. Therefore, for example, the integrated thermal expansion valve 123*a* integrally having the temperature detector and the passage adjustment unit can be easily attached to the refrigerant inlet 23 and the refrigerant outlet 24 provided in the connector 40.

(9) The heat exchanger 1 of the present embodiment is used in the battery temperature control system 100 that cools the battery 2 mounted on a vehicle. The heat exchanger 1 is configured as an evaporator that cools the cooling water that has absorbed heat from the battery 2 in the cooler 111 by the latent heat of vaporization of the refrigerant circulating in the refrigeration cycle 120. Therefore, it is possible to enhance the performance of the battery temperature control system 100 cooling the battery 2 by using this heat exchanger 1 in the battery temperature control system 100.

Second Embodiment

A second embodiment will be described. The second embodiment is a modification of the first embodiment, in which a part of the configuration inside the refrigerant passage 20 and the inside of the cooling water passage 30 is modified. Only parts different from the first embodiment will be described.

Figure 6:
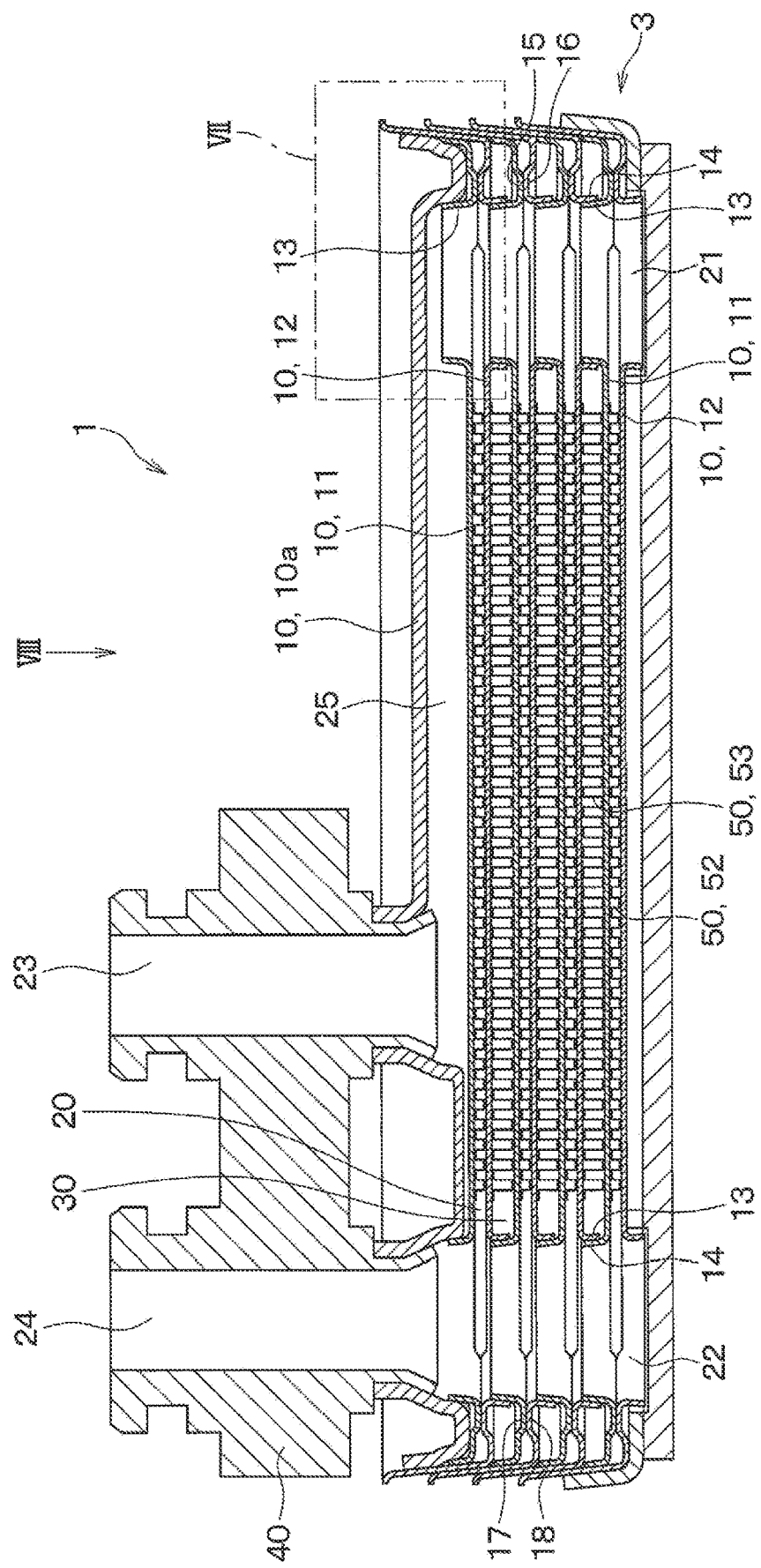
FIG. 6 is a cross-sectional view of a heat exchanger according to a second embodiment.
Figure 7:
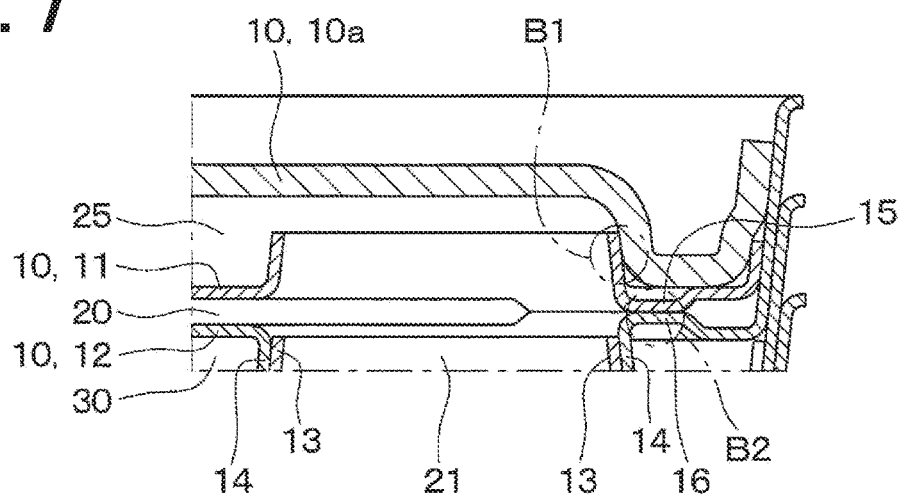
FIG. 7 is an enlarged view of a portion VII of FIG. 6.
Figure 8:
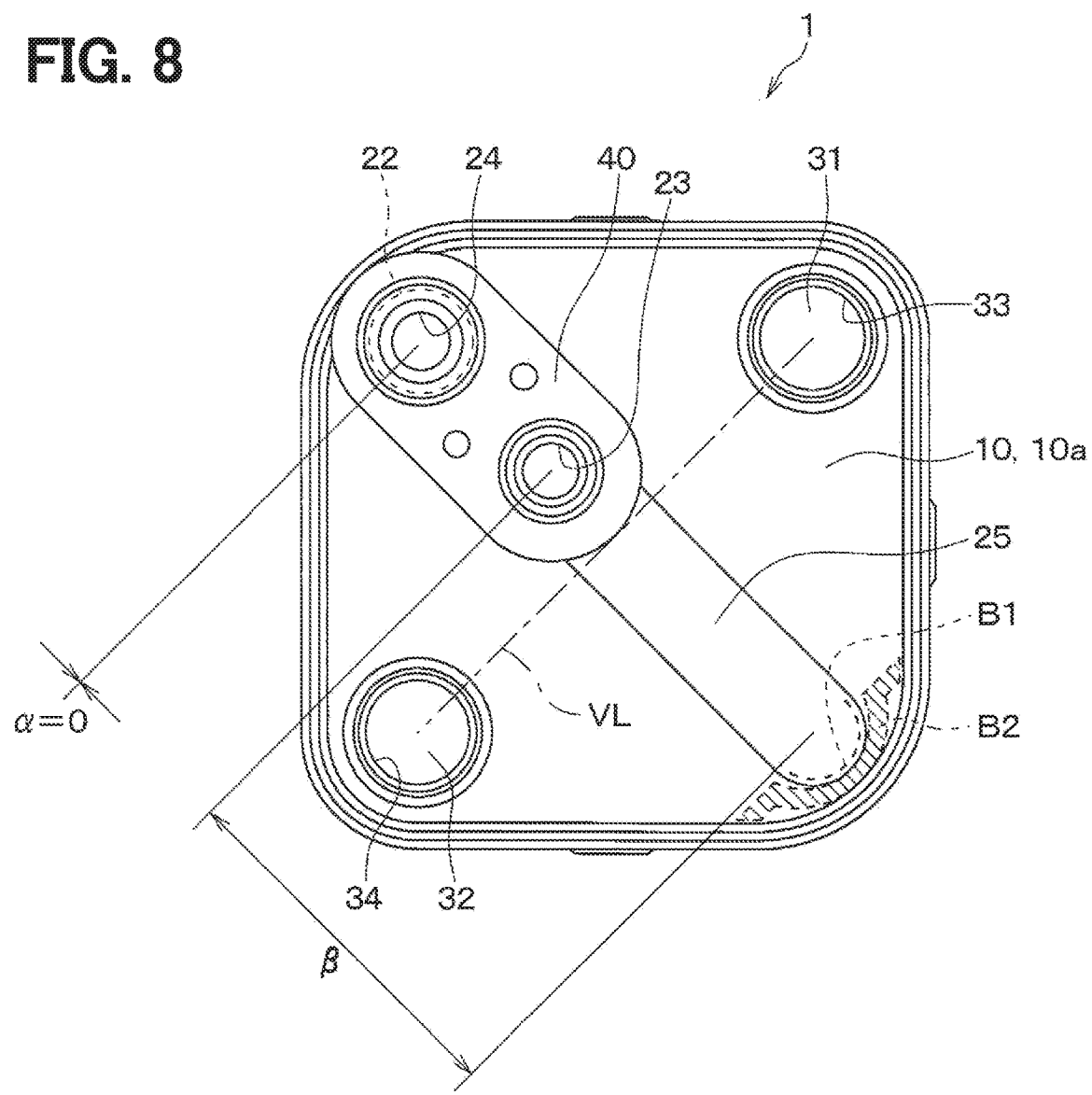
FIG. 8 is a plan view of the heat exchanger viewed in VIII direction of FIG. 6.

As shown in FIGS. 6 to 8, the heat exchanger 1 according to the second embodiment includes an inner fin 50 arranged in the refrigerant passages 20 and the cooling water passages 30 of the core part 3. The inner fin 50 may have various shapes such as an offset fin, a corrugated fin, or a louver fin. The inner fin 50 increases the heat transfer area to increase the heat exchange efficiency between the refrigerant flowing through the refrigerant passage 20 and the cooling water flowing through the cooling water passage 30.

The inner fin 50 provided in the refrigerant passages 20 is referred to as refrigerant inner fin 52, and the inner fin 50 provided in the cooling water passages 30 is referred to as cooling water inner fin 53. The refrigerant inner fin 52 is fixed to the plate 10 forming the refrigerant passage 20 by, for example, brazing. The cooling water inner fin 53 is fixed to the plate 10 forming the cooling water passage 30 by, for example, brazing.

In the second embodiment, as in the first embodiment, the inner fin 50 is not provided in the refrigerant inlet passage 25. As a result, a decrease in the flow velocity of the refrigerant flowing through the refrigerant inlet passage 25 is suppressed, and a decrease in the flow rate of the refrigerant flowing through the heat exchanger 1 is restricted. Therefore, while the heat exchanger 1 of the second embodiment includes the refrigerant inlet passage 25, it is possible to restrict a decrease in the ability to cool the cooling water due to the cold heat of the refrigerant.

In the second embodiment, a passage of the core part 3 adjacent to the refrigerant inlet passage 25 through the plate 10 is the refrigerant passage 20. In this case, heat exchange is not necessary between the refrigerant flowing through the refrigerant inlet passage 25 and the refrigerant flowing through the refrigerant passage 20 adjacent to the refrigerant inlet passage 25. Therefore, in the heat exchanger 1 of the second embodiment, while the inner fin 50 is not provided in the refrigerant inlet passage 25, the ability to cool the cooling water does not decrease.

In the second embodiment, the core part 3 is composed of two types of plates 10, e.g., a first plate 11 and a second plate 12. The first plate 11 has a burring 13 provided to project cylindrically from the flat surface portion of the plate 10 toward the connector 40 in the stacking direction. The second plate 12 has a burring 14 provided to project cylindrically from the flat surface portion of the plate 10 away from the connector 40 in the stacking direction. The first plate 11 and the second plate 12 are alternately stacked in the stacking direction. The burring 13 of the first plate 11 and the burring 14 of the second plate 12 are adhered to each other, whereby the refrigerant inlet tank section 21, the refrigerant outlet tank section 22, the cooling water inlet tank section 31, and the cooling water outlet tank section 32 are formed.

As shown in FIGS. 6 and 7, the burring 13 of the first plate 11 that is adjacent to the outermost end plate 10*a* in the stacking direction is bonded to a part of the outermost end plate 10*a* that forms the inner wall of the refrigerant inlet passage 25, by brazing or the like. In FIG. 7, the bonded portion between the burring 13 and the outermost end plate 10*a* is shown by being surrounded by a single chain line B1. In FIG. 8, the bonded portion is indicated by a broken line B1. This makes it possible to increase the rigidity of the outermost end plate 10*a* in the stacking direction and to increase the pressure resistance of the refrigerant inlet passage 25 in the stacking direction. Therefore, the heat exchanger 1 of the second embodiment can be restricted from being destroyed even when the pressure of the refrigerant flowing through the refrigerant inlet passage 25 becomes high.

As shown in FIGS. 6 and 7, the first plate 11 has a first rib 15 projecting toward the second plate 12 on a part of the outer side of the refrigerant inlet tank section 21. The second plate 12 has a second rib 16 protruding toward the first plate 11 on a part of the outer side of the refrigerant inlet tank section 21. The first rib 15 of the first plate 11 and the second rib 16 of the second plate 12 are bonded by brazing or the like. In FIG. 7, the bonded portion between the first rib 15 and the second rib 16 is shown by being surrounded by a single chain line B2. In FIG. 8, the bonded portion is indicated by a broken line B2 and hatching. The first rib 15 of the first plate 11 and the second rib 16 of the second plate 12 are bonded to each other, whereby the positioning of the first plate 11 and the second plate 12 are determined in the stacking direction, and the pressure resistance of the core part 3 in the stacking direction is increased.

As shown in FIG. 6, the first plate 11 has a third rib 17 protruding toward the second plate 12 on a part of the outer side of the refrigerant outlet tank section 22. The second plate 12 has a fourth rib 18 protruding toward the first plate 11 on a part of the outer side of the refrigerant outlet tank section 22. The third rib 17 of the first plate 11 and the fourth rib 18 of the second plate 12 are bonded by brazing or the like. The third rib 17 of the first plate 11 and the fourth rib 18 of the second plate 12 are bonded to each other, whereby the positioning of the first plate 11 and the second plate 12 are determined in the stacking direction and the pressure resistance of the core part 3 in the stacking direction is increased. As a result, the heat exchanger 1 of the second embodiment can be restricted from breaking even when the refrigerant pressure becomes high.

Third Embodiment

A third embodiment will be described. The third embodiment is different from the second embodiment and the like in the configuration of the inside of the refrigerant inlet passage 25, and the other part is the same as the second embodiment and the like. Therefore, only the part different from the first embodiment and the like will be described.

Figure 9:
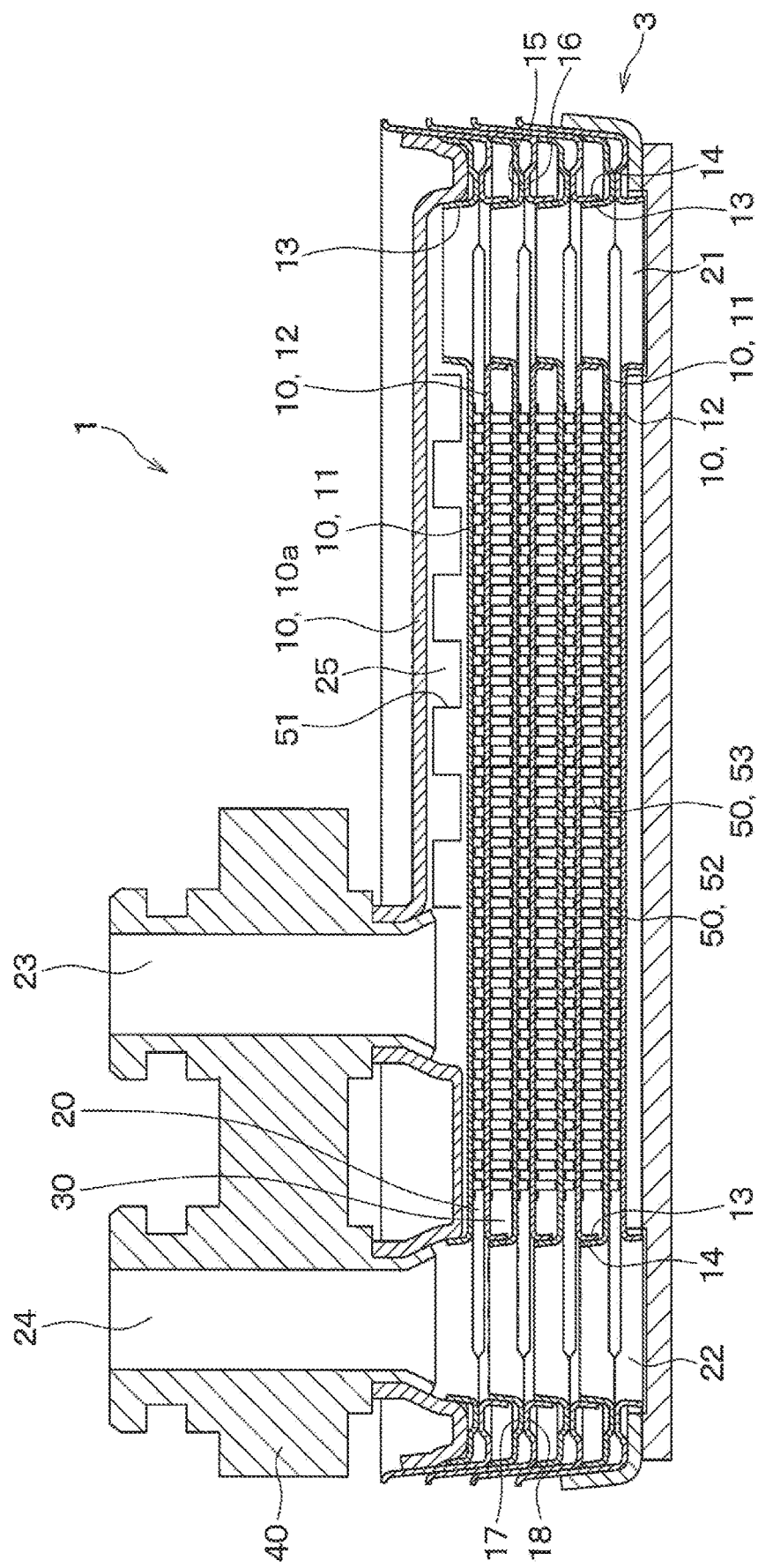
FIG. 9 is a cross-sectional view of a heat exchanger according to a third embodiment.

As shown in FIG. 9, in the third embodiment, a low-pressure-loss inner fin 51 is provided in the refrigerant inlet passage 25. The low-pressure-loss inner fin 51 is formed to have a passage resistance smaller than that of the inner fin 50 provided in the refrigerant passages 20 and the cooling water passages 30. The low-pressure-loss inner fin 51 is adhered to the outermost end plate 10a forming the refrigerant inlet passage 25 and the adjacent plate 10 adjacent thereto by, for example, brazing. This makes it possible to increase the pressure resistance of the refrigerant inlet passage 25.

Instead of providing the low-pressure-loss inner fin 51 in the refrigerant inlet passage 25, a low-pressure-loss structure may be provided such as rib having a passage resistance smaller than that of the inner fin 50 provided in the refrigerant passages 20 and the cooling water passages 30.

In the third embodiment, the pressure loss of the low-pressure-loss inner fin 51 or the structure provided in the refrigerant inlet passage 25 is low, thereby suppressing a decrease in the flow velocity of the refrigerant flowing through the refrigerant inlet passage 25. Thus, it is possible to suppress a decrease in the flow rate of the refrigerant flowing through the heat exchanger 1. Therefore, even if the heat exchanger 1 of the third embodiment includes the inner fins or the like in the refrigerant inlet passage 25, it is possible to restrict the ability to cool the cooling water from decreasing.

Further, in the third embodiment, the low-pressure-loss inner fin 51 or the low-pressure-loss structure is provided in the refrigerant inlet passage 25 to increase the rigidity of the refrigerant inlet passage 25 and increase the pressure resistance of the refrigerant inlet passage 25.

Fourth Embodiment

A fourth embodiment will be described. The fourth embodiment is a modification of the first embodiment and the like, in which the configuration of the refrigerant inlet passage 25 is modified. The other part is the same as the first embodiment and the like. Only the part different from the first embodiment and the like will be described.

Figure 10:
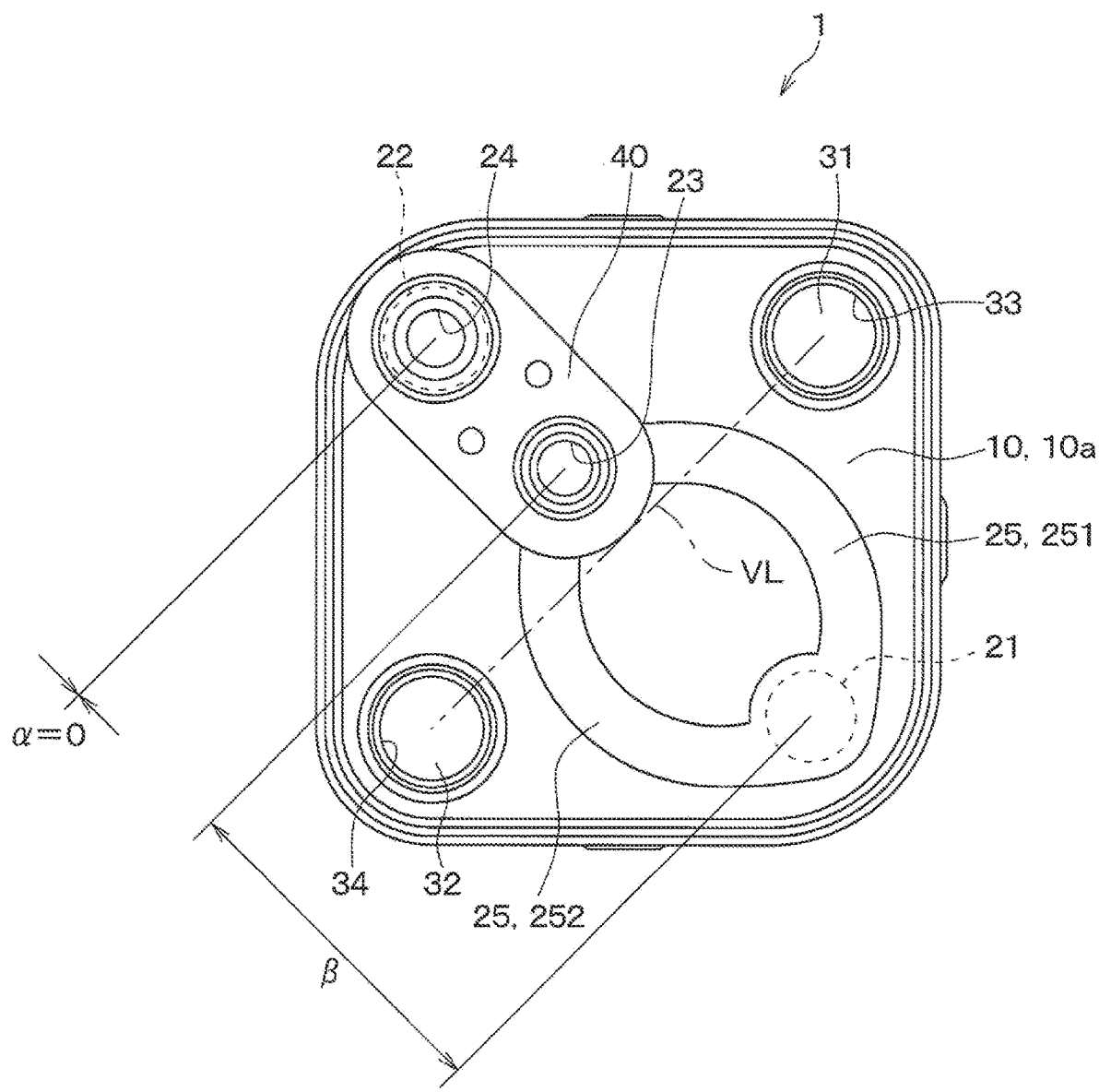
FIG. 10 is a plan view of a heat exchanger according to a fourth embodiment.

As shown in FIG. 10, the heat exchanger 1 of the fourth embodiment includes plural refrigerant inlet passages 251 and 252 that connect the refrigerant inlet 23 and the refrigerant inlet tank section 21. The number and shape of the refrigerant inlet passages 25 can be appropriately changed according to the space of the vehicle in which the heat exchanger 1 is mounted.

In the fourth embodiment, it is possible to increase the total passage cross-sectional area of the refrigerant inlet passages 25 by increasing the number of the refrigerant inlet passages 25. Therefore, in the fourth embodiment, the passage resistance of the refrigerant inlet passage 25 can be reduced. Further, when the total passage cross-sectional area of the refrigerant inlet passages 25 of the fourth embodiment is the same as the passage cross-sectional area of one refrigerant inlet passage 25 in the first embodiment and the like, it is possible to reduce the height of the refrigerant inlet passage 25 in the fourth embodiment.

Fifth Embodiment

A fifth embodiment will be described. In the fifth embodiment, the arrangement of the connector 40 and a part of the refrigerant inlet passage 25 are changed from those of the first embodiment. The other aspects are the same as those of the first embodiment and the like. Only parts different from the first embodiment and the like will be described.

Figure 11:
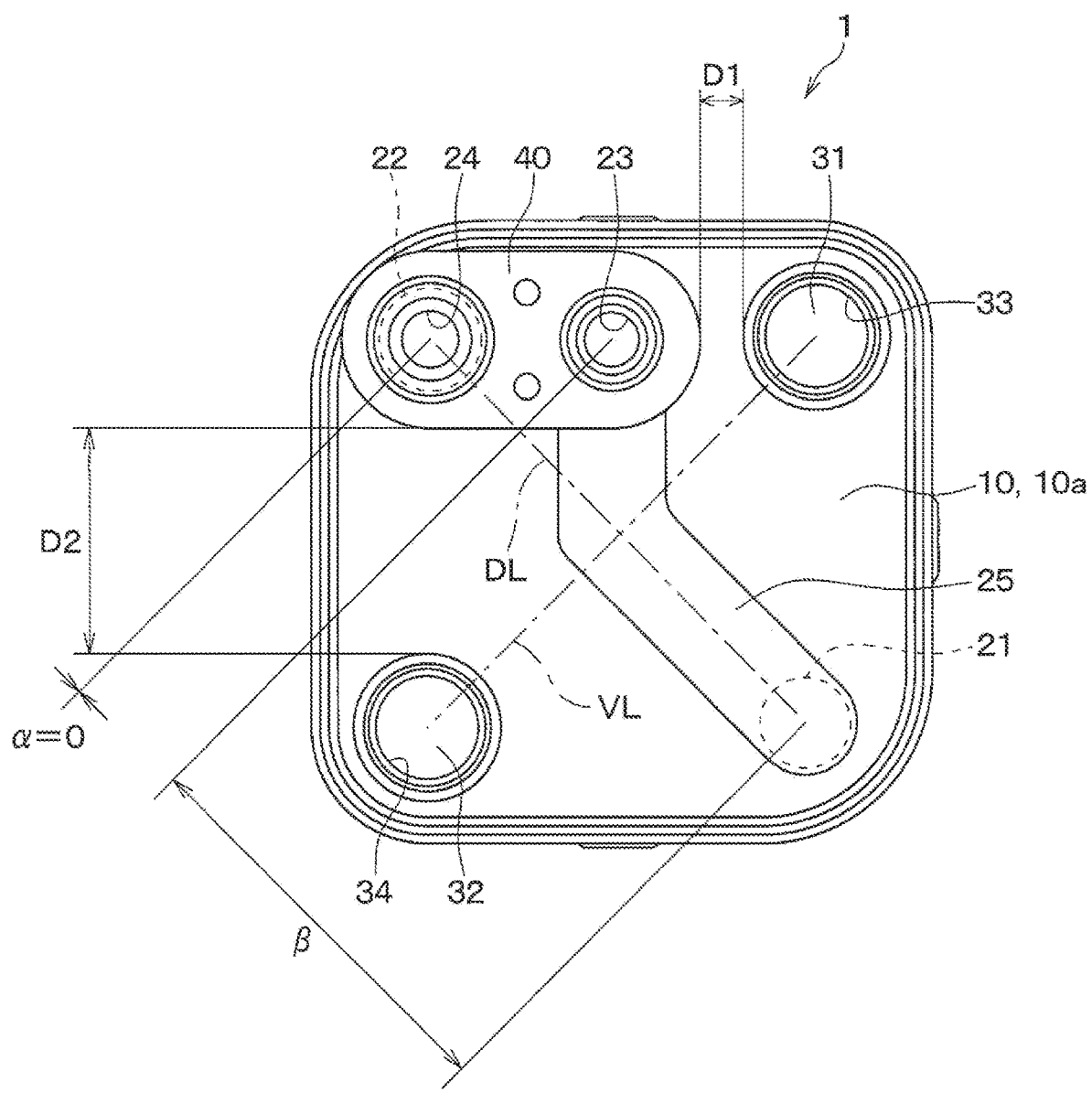
FIG. 11 is a plan view of a heat exchanger according to a fifth embodiment.

As shown in FIG. 11, in the fifth embodiment, a portion of the connector 40 where the refrigerant inlet 23 is provided is located adjacent to the cooling water inlet 33 with respect to the diagonal line DL that connects the refrigerant inlet tank section 21 and the refrigerant outlet tank section 22. The distance D1 between the connector 40 and the cooling water inlet 33 is shorter than the distance D2 between the connector 40 and the cooling water outlet 34.

Also in the fifth embodiment, the connector 40 is arranged so that the center-to-center distance α between the refrigerant outlet tank section 22 and the refrigerant outlet 24 is shorter than the center-to-center distance β between the refrigerant inlet tank section 21 and the refrigerant inlet 23. Further, the connector 40 is arranged in an area adjacent to the refrigerant outlet tank section 22, with respect to the line VL connecting the center of the cooling water inlet tank section 31 and the center of the cooling water outlet tank section 32.

The refrigerant inlet passage 25 extends from the refrigerant inlet tank section 21 to a central portion of the core part 3 along a diagonal line DL connecting the refrigerant inlet tank section 21 and the refrigerant outlet tank section 22, and is bent at the central portion of the core part 3 toward the refrigerant inlet 23 provided in the connector 40. As described above, the arrangement of the connector 40 and the shape of the refrigerant inlet passage 25 can be appropriately changed according to the space of the vehicle in which the heat exchanger 1 is mounted.

Sixth Embodiment

A sixth embodiment will be described. In the sixth embodiment, the shape of the core part 3 is changed from that of the first embodiment and the like, and the other parts are the same as those of the first embodiment and the like, so only the portions different from the first embodiment and the like will be described.

Figure 12:
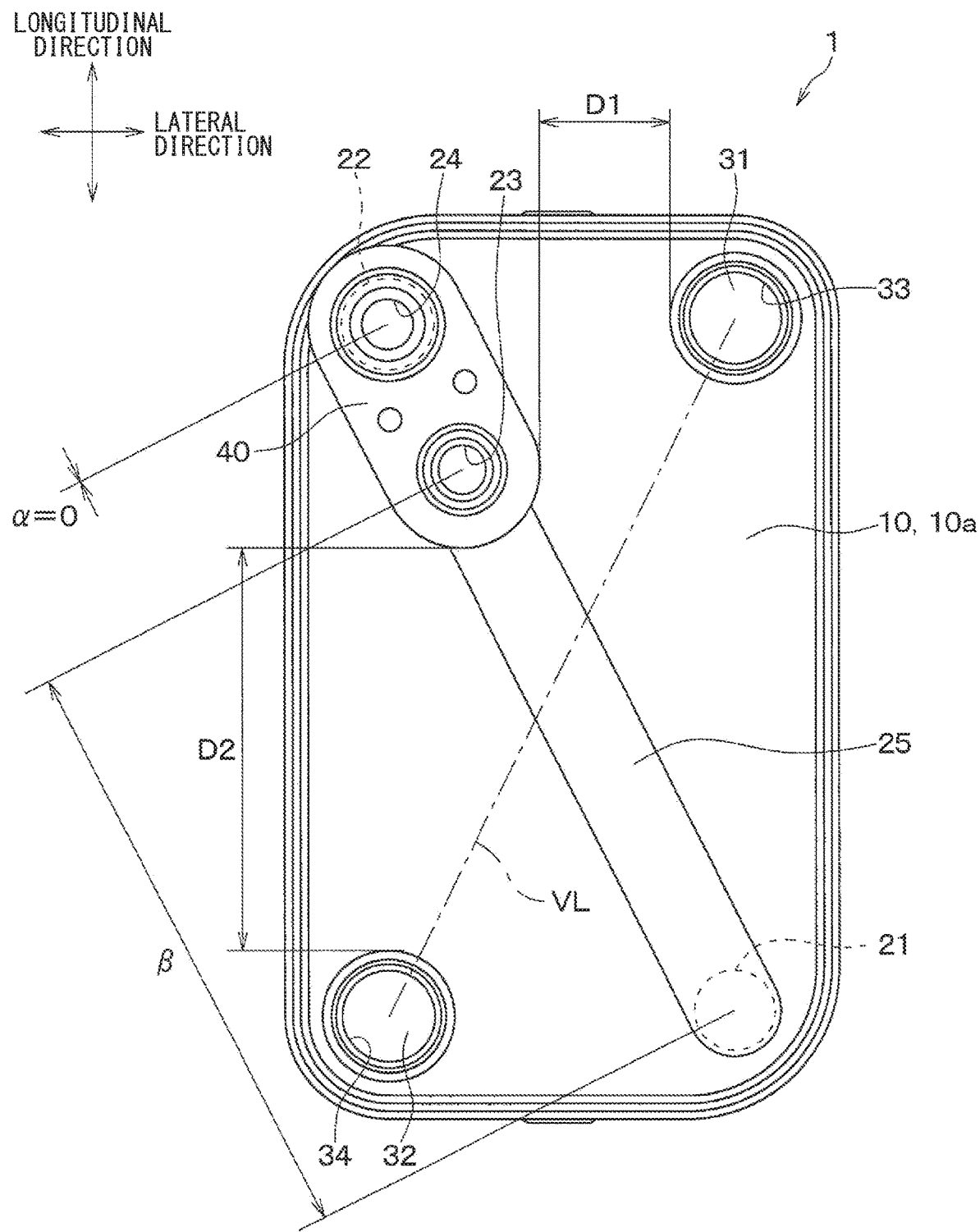
FIG. 12 is a plan view of a heat exchanger according to a sixth embodiment.

As shown in FIG. 12, in the sixth embodiment, the core part 3 is shaped to have a longitudinal direction and a lateral direction as viewed from the stacking direction. Also in the sixth embodiment, as in the first embodiment, the refrigerant inlet tank section 21 and the refrigerant outlet tank section 22 are arranged respectively at corners of a diagonal line in the shape of the core part 3 viewed from the stacking direction. Further, the cooling water inlet tank section 31 and the cooling water outlet tank section 32 are arranged respectively at corners on another diagonal line different from the diagonal line.

Also in the sixth embodiment, the connector 40 is arranged such that the center-to-center distance α between the refrigerant outlet tank section 22 and the refrigerant outlet 24 is shorter than the center-to-center distance β between the refrigerant inlet tank section 21 and the refrigerant inlet 23. Specifically, the connector 40 is provided so that the refrigerant outlet 24 is located directly above the refrigerant outlet tank section 22. Further, the connector 40 is arranged in an area adjacent to the refrigerant outlet tank section 22, with respect to the line VL connecting the center of the cooling water inlet tank section 31 and the center of the cooling water outlet tank section 32.

In the sixth embodiment, the distance D1 between the connector 40 and the cooling water inlet tank section 31 is shorter than the distance D2 between the connector 40 and the cooling water outlet tank section 32. As a result, the refrigerant outlet tank section 22 and the cooling water inlet tank section 31 are arranged side by side in the lateral direction at one end portion in the longitudinal direction. In addition, the refrigerant inlet tank section 21 and the cooling water outlet tank section 32 are arranged in the lateral direction at the other end portion in the longitudinal direction to face the refrigerant outlet tank section 22 and the cooling water inlet tank section 31. Therefore, the flow of the refrigerant flowing through the refrigerant passages 20 formed in the core part 3 and the flow of the cooling water flowing through the cooling water passages 30 are made as counterflows. Therefore, the heat exchange efficiency of the heat exchanger 1 can be improved between the refrigerant and the cooling water so as to improve the ability to cool the cooling water.

Seventh Embodiment

A seventh embodiment will be described. In the seventh embodiment, the arrangement of the connector 40 is changed with respect to the sixth embodiment and the like, and the other aspects are the same as those in the sixth embodiment and the like, so only the portions different from the sixth embodiment and the like will be described.

Figure 13:
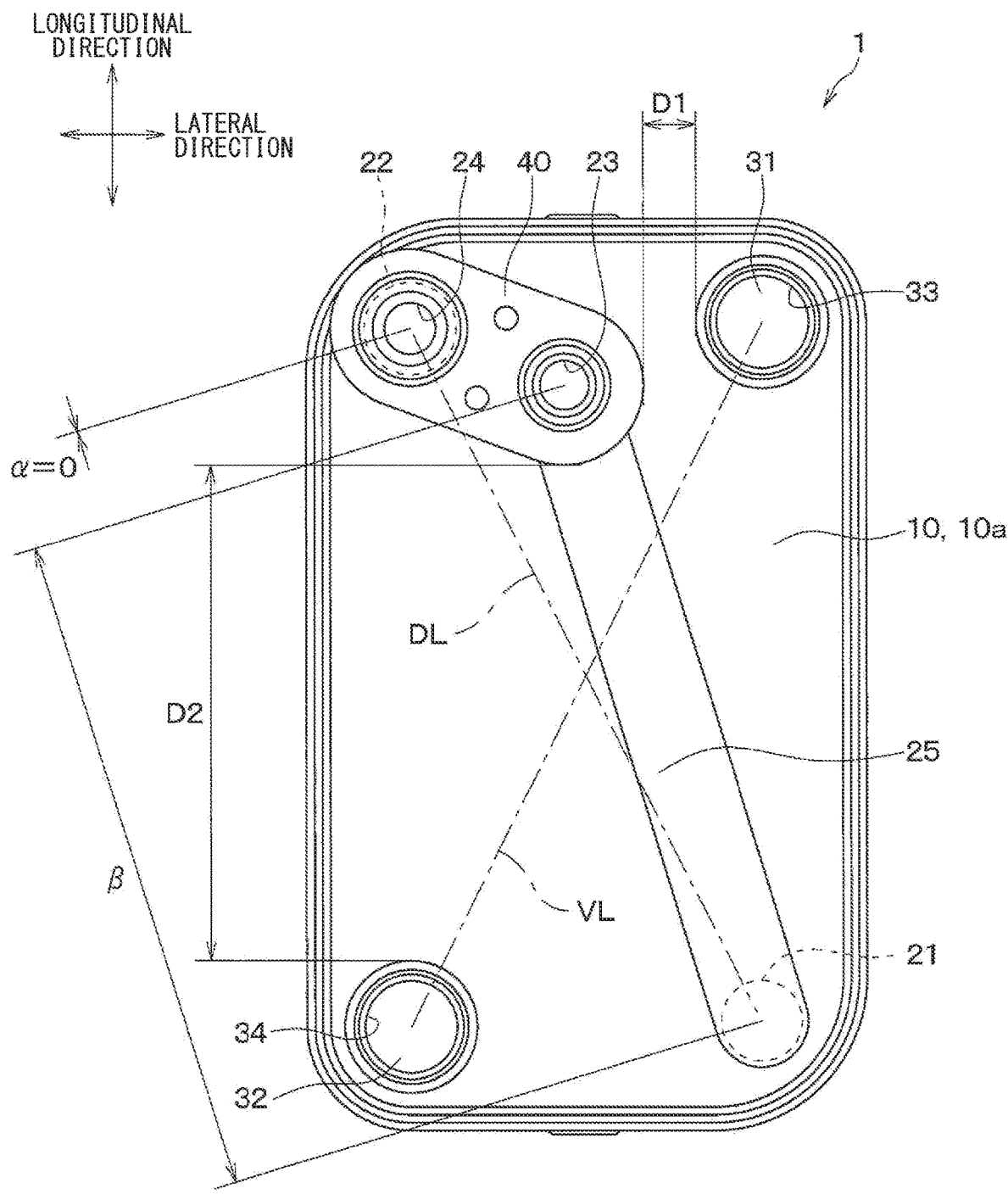
FIG. 13 is a plan view of a heat exchanger according to a seventh embodiment.

As shown in FIG. 13, in the seventh embodiment, a portion of the connector 40 where the refrigerant inlet 23 is provided is deviated toward the cooling water inlet 33 with respect to the diagonal line DL that connects the refrigerant inlet tank section 21 and the refrigerant outlet tank section 22. Therefore, the distance D1 between the connector 40 and the cooling water inlet 33 is made more shorter in this embodiment. The refrigerant inlet passage 25 is provided so as to linearly communicate the refrigerant inlet 23 provided in the connector 40 and the cooling water inlet tank section 31. As described above, the arrangement of the connector 40 and the shape of the refrigerant inlet passage 25 can be appropriately changed according to the space of the vehicle in which the heat exchanger 1 is mounted.

Eighth Embodiment

An eighth embodiment will be described hereafter. In the eighth embodiment, the arrangement of the connector 40 is changed from that of the sixth embodiment and the like, and the other parts are the same as those of the sixth embodiment and the like, so only the portions different from the sixth embodiment and the like will be described.

Figure 14:
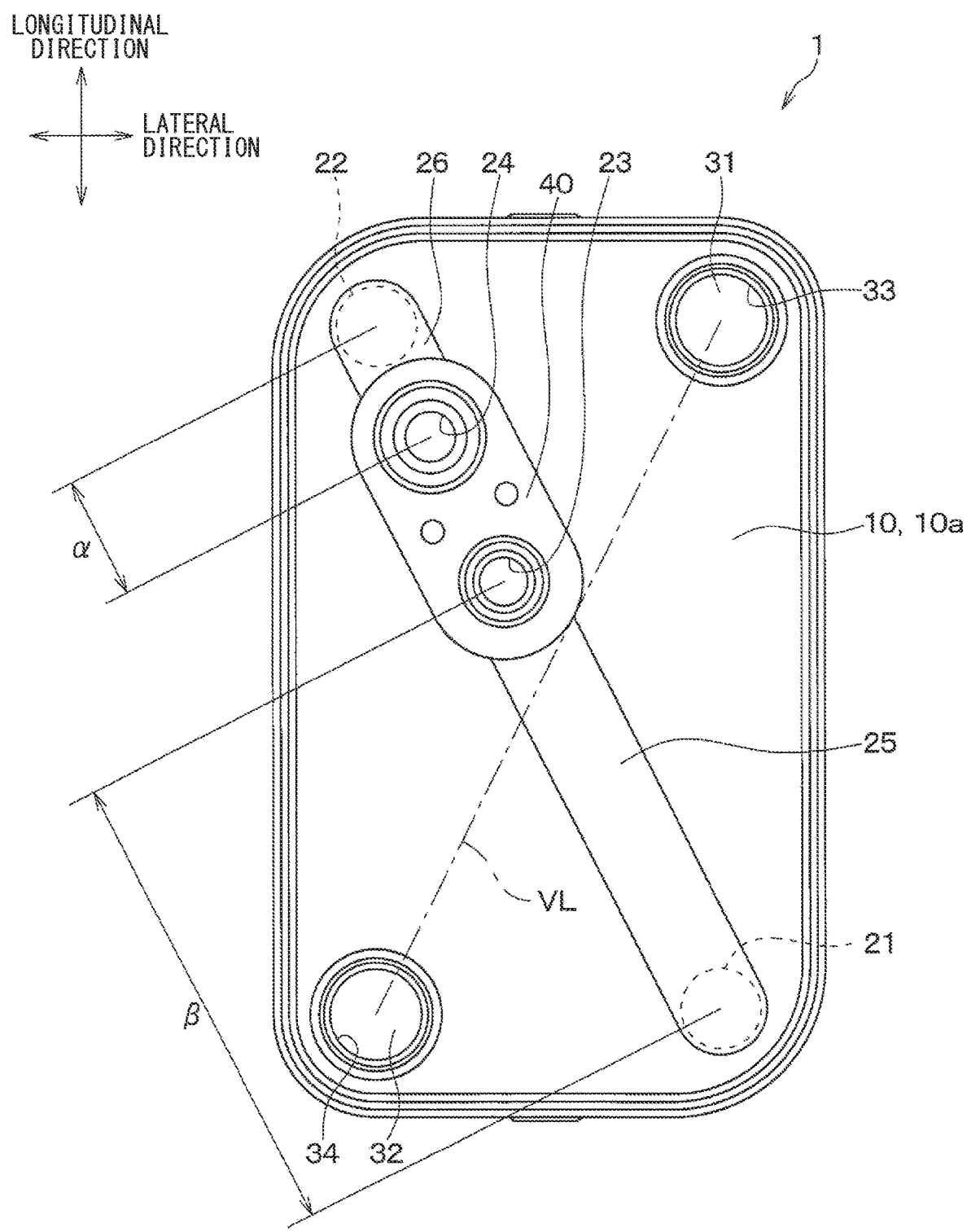
FIG. 14 is a plan view of a heat exchanger according to an eighth embodiment.

As shown in FIG. 14, in the eighth embodiment, the connector 40 is arranged at a position away from the refrigerant outlet tank section 22. The refrigerant outlet 24 provided in the connector 40 and the refrigerant outlet tank section 22 are communicated with each other by a refrigerant return passage 26. Similar to the refrigerant inlet passage 25, the refrigerant return passage 26 is provided between the outermost end plate 10a and the adjacent plate 10b adjacent to the outermost end plate 10a in the stacking direction.

In the eighth embodiment, the center-to-center distance α between the refrigerant outlet tank section 22 and the refrigerant outlet 24 is shorter than the center-to-center distance β between the refrigerant inlet tank section 21 and the refrigerant inlet 23. As described above, the arrangement of the connector 40 and the shape of the refrigerant inlet passage 25 can be appropriately changed according to the space of the vehicle in which the heat exchanger 1 is mounted. Also in the eighth embodiment, the refrigerant inlet 23 and the refrigerant outlet 24 are arranged close to each other in the heat exchanger 1, and it is possible to restrict a decrease in the ability to cool the cooling water.

In the eighth embodiment, the connector 40 is provided in the area adjacent to the refrigerant outlet tank section 22 with respect to the line VL connecting the center of the cooling water inlet tank section 31 and the center of the cooling water outlet tank section 32. That is, it is possible to restrict the ability to cool the cooling water from decreasing by shortening the center-to-center distance α between the refrigerant outlet tank section 22 and the refrigerant outlet 24.

Ninth Embodiment

A ninth embodiment will be described hereafter. In the ninth embodiment, the arrangement of the cooling water inlet 33 and the cooling water outlet 34 is changed from that of the sixth embodiment and the like, and the other parts are the same as those of the sixth embodiment and the like. Only parts different from the sixth embodiment and the like will be described.

Figure 15:
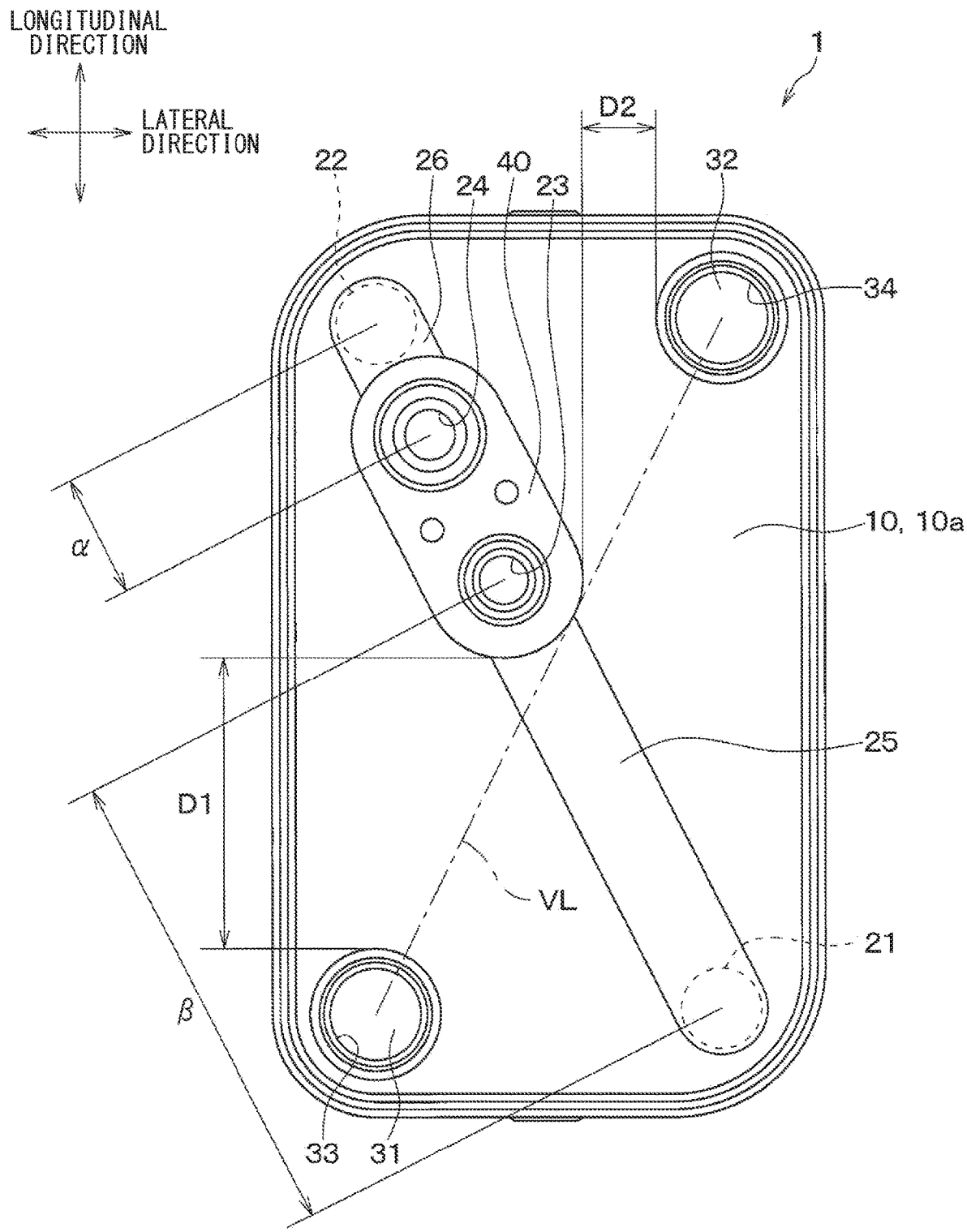
FIG. 15 is a plan view of a heat exchanger according to a ninth embodiment.

As shown in FIG. 15, in the ninth embodiment, the refrigerant outlet tank section 22 and the cooling water outlet tank section 32 are arranged side by side in the lateral direction at one end portion in the longitudinal direction.

Further, the refrigerant inlet tank section 21 and the cooling water inlet tank section 31 are arranged in the lateral direction at the other end portion in the longitudinal direction to face the refrigerant outlet tank section 22 and the cooling water outlet tank section 32. Therefore, in the ninth embodiment, the distance D2 between the connector 40 and the cooling water outlet tank section 32 is shorter than the distance D1 between the connector 40 and the cooling water inlet tank section 31. As a result, the flow of the refrigerant flowing through the refrigerant passages 20 formed in the core part 3 and the flow of the cooling water flowing through the cooling water passages 30 become parallel flows. The heat exchanger 1 can adopt the parallel flow.

Other Embodiments

The present disclosure is not limited to the embodiments described above, and can be modified as appropriate. The embodiments are not independent of each other, and can be appropriately combined except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Also, the shape, the positional relationship, and the like of the component or the like mentioned in the above embodiments are not limited to those being mentioned unless otherwise specified, limited to the specific shape, positional relationship, and the like in principle, or the like.

(1) In the embodiments, the heat exchanger 1 is used in the battery temperature control system 100, but is not limited to this. The heat exchanger 1 can be used for various purposes as a water-refrigerant heat exchanger that cools cooling water by latent heat of vaporization of the refrigerant circulating in the refrigeration cycle 120.

(2) In the embodiments, the refrigerant inlet 23, the refrigerant outlet 24, the cooling water inlet 33, and the cooling water outlet 34 are arranged at one end of the core part 3 in the stacking direction, but is not limited to this. The cooling water inlet 33 and the cooling water outlet 34 may be provided at the opposite end opposite to the refrigerant inlet 23 and the refrigerant outlet 24 in the stacking direction. The cooling water inlet 33 and the cooling water outlet 34 may be provided on an outer wall of the core part 3 intersecting the stacking direction.

(3) In the embodiments, the shape of the heat exchanger 1 viewed from the stacking direction is a substantially square shape or a substantially rectangular shape. Alternatively, the shape of the heat exchanger 1 may be oval, oblong, polygon, and the like.

(4) In the embodiments, the passage adjacent to the refrigerant inlet passage 25 through the plate 10 in the core part 3 is the refrigerant passage 20, but the passage is not limited to this and may be the cooling water passage 30.

(5) In the embodiments, the refrigerant inlet tank section 21 and the refrigerant outlet tank section 22 are arranged respectively at corners on a diagonal line in the shape of the core part 3 viewed from the stacking direction. Then, the cooling water inlet tank section 31 and the cooling water outlet tank section 32 are arranged respectively at corners on another diagonal line different from the diagonal line, but are not limited to this.

In another embodiment, the refrigerant inlet tank section 21 and the refrigerant outlet tank section 22 may be provided at positions separated from each other. For example, the refrigerant inlet tank section 21 and the refrigerant outlet tank section 22 may be provided in the middle, respectively, of two opposing sides of a rectangular shape of the core part 3 viewed from the stacking direction. Further, for example, the cooling water inlet tank section 31 and the cooling water outlet tank section 32 may be provided in the middle, respectively, of the other two opposing sides of the core part 3. The arrangement of the refrigerant inlet tank section 21 and the refrigerant outlet tank section 22 described in the embodiments may be reversed.

(6) In the embodiments, the battery temperature control system 100 cools the battery 2 mounted in the vehicle. However, the battery temperature control system 100 is not limited to this, and may have a heater in the cooling water circuit 110 to warm the battery 2.

(7) In the embodiments, the expansion valve 123 and the like are attached to the connector 40 in the heat exchanger 1, but is not limited to this. The connector 40 and the expansion valve 123 may be integrally formed.

(8) In the embodiments, the refrigerant outlet 24 and the refrigerant inlet 23 provided in the connector 40 are located in the area adjacent to the refrigerant outlet tank section 22, with respect to the line VL connecting the center of the cooling water inlet tank section 31 and the center of the cooling water outlet tank section 32, but is not limited to this. In another embodiment, a part of the refrigerant outlet 24 and the refrigerant inlet 23 provided in the connector 40 may be located in an area adjacent to the cooling water inlet tank section 31 with respect to the line VL connecting the center of the cooling water inlet tank section 31 and the center of the cooling water outlet tank section 32.

Overview

According to the first aspect shown in part or all of the embodiments, the stacked heat exchanger cools the cooling water flowing through the cooling water circuit by the latent heat of vaporization of the refrigerant circulating in the refrigeration cycle. This heat exchanger includes a core part, a refrigerant inlet tank section, a refrigerant outlet tank section, a refrigerant outlet, a refrigerant inlet, and a refrigerant inlet passage. The core part includes a plurality of plates stacked with a gap so as to form a plurality of refrigerant passages and a plurality of cooling water passages. A refrigerant flowing through the refrigerant passages and a cooling water flowing through the cooling water passages exchange heat with each other. The refrigerant inlet tank section and the refrigerant outlet tank section communicate the refrigerant passages with each other in the stacking direction, and are provided at positions separated from each other. The cooling water inlet tank section and the cooling water outlet tank section are provided at positions separated from each other, and communicate the cooling water passages with each other in the stacking direction. The refrigerant inlet and the refrigerant outlet are provided at one end of the core part in the stacking direction and communicate with the refrigerant inlet tank section and the refrigerant outlet tank section, respectively. The refrigerant inlet passage connects the refrigerant inlet and the refrigerant inlet tank section. The center-to-center distance between the refrigerant outlet tank section and the refrigerant outlet is shorter than the center-to-center distance between the refrigerant inlet tank section and the refrigerant inlet.

According to the second aspect, an expansion valve is provided upstream of the refrigerant inlet for decompressing and expanding the high-pressure refrigerant flowing through the refrigeration cycle. Accordingly, the heat exchanger functions as an evaporator of the refrigeration cycle.

According to the third aspect, the refrigerant inlet passage is defined between an outermost end plate provided at one end of the plates in the stacking direction and an adjacent plate adjacent to the outermost end plate in the stacking direction. The adjacent plate has a burring protruding toward the refrigerant inlet passage from a portion that forms the refrigerant inlet tank section. The burring is bonded to a part of the outermost end plate that forms an inner wall of the refrigerant inlet passage.

Accordingly, it is possible to increase the pressure resistance of the refrigerant inlet passage by increasing the rigidity of the outermost end plate in the stacking direction. Therefore, even if the pressure of the refrigerant flowing through the refrigerant inlet passage becomes high, it is possible to restrict the heat exchanger from being destroyed.

According to the fourth aspect, the heat exchanger further includes a connector that is connected to a component of the refrigeration cycle. The refrigerant inlet and the refrigerant outlet are provided on the connector.

Accordingly, the manufacturing tolerance regarding the positions of the refrigerant inlet and the refrigerant outlet can be made small. Therefore, for example, an integrated thermal expansion valve integrally including the temperature detector and the passage adjustment unit can be easily attached to the refrigerant inlet and the refrigerant outlet provided in the connector.

Accordingly, the heat exchanger further includes an inner fin provided in the refrigerant passages and the cooling water passages forming the core part. No inner fin is provided in the refrigerant inlet passage, or a low-pressure-loss inner fin or structure with low-pressure-loss is provided in the refrigerant inlet passage, whose passage resistance is smaller than that of the inner fin provided in the refrigerant passages and the cooling water passages.

Accordingly, by not providing the inner fin or by using the low-pressure-loss fin in the refrigerant inlet passage, the flow velocity of the refrigerant flowing through the refrigerant inlet passage is restricted from decreasing, so that a decrease in the flow rate of the refrigerant flowing through the heat exchanger can be restricted. Therefore, even if the refrigerant inlet and the refrigerant outlet are arranged close to each other and the refrigerant inlet passage is provided, it is possible to restrict a decrease in the ability of the heat exchanger to cool the cooling water by the cold heat of the refrigerant.

When the passage adjacent to the refrigerant inlet passage through the plate in the core part is the refrigerant passage, heat exchange is not necessary between the refrigerant flowing through the refrigerant passage and the refrigerant flowing through the refrigerant inlet passage. Therefore, in this heat exchanger, the ability to cool the cooling water does not decrease while the inner fin is not provided in the refrigerant inlet passage.

According to the sixth aspect, the refrigeration cycle and the cooling water circuit form a battery temperature control system for cooling a battery mounted on a vehicle. The cooling water circuit includes a cooler that cools the battery with cooling water. The heat exchanger is connected to the upstream side of the compressor and to the downstream side of the expansion valve of the refrigeration cycle, and is also connected to the cooling water circuit. The heat exchanger is configured as an evaporator that cools the cooling water that has absorbed heat from the battery in the cooler by the latent heat of vaporization of the refrigerant that circulates through the refrigeration cycle.

Accordingly, it is possible to cool the battery mounted on the vehicle via the cooling water circuit by the cold heat generated in the refrigeration cycle using this heat exchanger. Therefore, by using this heat exchanger in the battery temperature control system, the performance of the battery temperature control system cooling the battery can be enhanced. Further, the mountability of the battery temperature control system on the vehicle can be improved.

According to the seventh aspect, the core part is shaped to have a longitudinal direction and a lateral direction as viewed from the stacking direction. The distance between the connector and the cooling water inlet tank section is shorter than the distance between the connector and the cooling water outlet tank section.

Accordingly, as described above, the refrigerant inlet tank section and the refrigerant outlet tank section are respectively arranged at one corner portion and the other corner portion on the diagonal line in the shape of the core part viewed from the stacking direction. Further, the cooling water inlet tank section and the cooling water outlet tank section are arranged at one corner and the other corner on another diagonal line different from the diagonal line. When the distance between the connector and the cooling water inlet tank section is shorter than the distance between the connector and the cooling water outlet tank section, the distance between the refrigerant outlet tank section and the cooling water inlet tank section provided in the connector becomes shorter. That is, the distance between the refrigerant inlet tank section and the cooling water outlet tank section becomes shorter. Therefore, the flow of the refrigerant flowing through the refrigerant passages formed in the core part and the flow of the cooling water flowing through the cooling water passages are counter flows. Therefore, it is possible to improve the efficiency of heat exchange between the refrigerant and the cooling water and to improve the ability of the heat exchanger to cool the cooling water.

What is claimed is:

1. A heat exchanger configured to cool cooling water flowing in a cooling water circuit by latent heat of vaporization of refrigerant circulating in a refrigeration cycle, comprising:
   a core part including a plurality of plates stacked with each other through a gap to form a plurality of refrigerant passages and a plurality of cooling water passages, in which heat is exchanged between the refrigerant flowing through the refrigerant passages and the cooling water flowing through the cooling water passages;
   a refrigerant inlet tank section and a refrigerant outlet tank section distanced from each other and communicating the plurality of refrigerant passages with each other in a stacking direction of the plates;
   a cooling water inlet tank section and a cooling water outlet tank section distanced from each other and communicating the plurality of cooling water passages with each other in the stacking direction;
   a refrigerant inlet and a refrigerant outlet provided at one end of the core part in the stacking direction to communicate with the refrigerant inlet tank section and the refrigerant outlet tank section, respectively;

a refrigerant inlet passage communicating the refrigerant inlet and the refrigerant inlet tank section with each other; and a connector to be connected with a component of the refrigeration cycle, wherein a distance between a center of the refrigerant outlet tank section and a center of the refrigerant outlet is shorter than a distance between a center of the refrigerant inlet tank section and a center of the refrigerant inlet, the refrigerant inlet and the refrigerant outlet are provided in the connector, the core part is shaped to have a longitudinal direction and a lateral direction as viewed from the stacking direction, and a distance between the connector and the cooling water inlet tank section is shorter than a distance between the connector and the cooling water outlet tank section.

2. The heat exchanger according to claim 1, wherein an expansion valve is provided upstream of the refrigerant inlet to decompress and expand high-pressure refrigerant flowing through the refrigeration cycle.

3. The heat exchanger according to claim 1, wherein the refrigerant inlet passage is defined between an outermost end plate of the plurality of plates provided at one end in the stacking direction and an adjacent plate adjacent to the outermost end plate in the stacking direction, the adjacent plate has a burring protruding toward the refrigerant inlet passage from a portion that forms the refrigerant inlet tank section, and the burring is bonded to a part of the outermost end plate that forms an inner wall of the refrigerant inlet passage.

4. The heat exchanger according to claim 1, wherein the refrigeration cycle and the cooling water circuit define a battery temperature control system to cool a battery mounted on a vehicle, the cooling water circuit includes a cooler that cools the battery with cooling water, the heat exchanger is connected downstream of an expansion valve of the refrigeration cycle and is connected upstream of a compressor, the heat exchanger is connected to the cooling water circuit, and the heat exchanger is configured as an evaporator that cools the cooling water that has absorbed heat from the battery by the latent heat of vaporization of refrigerant that circulates in the refrigeration cycle.

5. The heat exchanger according to claim 1, wherein the refrigerant inlet passage is defined between an outermost end plate of the plurality of plates provided at one end in the stacking direction and an adjacent plate adjacent to the outermost end plate in the stacking direction.

6. The heat exchanger according to claim 1, wherein the refrigerant inlet and the refrigerant outlet are provided adjacent to each other and located inside the connector.

7. The heat exchanger according to claim 1, wherein the refrigerant inlet and the refrigerant outlet are provided adjacent to each other and contained entirely inside the connector, on the one end of the core part in the stacking direction.

8. The heat exchanger according to claim 1, wherein refrigerant flows through the refrigerant inlet in a first direction and flows through the refrigerant outlet in a second direction, the first direction being opposite to the second direction.

9. The heat exchanger according to claim 1, wherein refrigerant enters the connector through the refrigerant inlet in a first direction and exits the connector through the refrigerant outlet in a second direction, the first direction being opposite to the second direction.

10. The heat exchanger according to claim 1, wherein the refrigerant inlet and the refrigerant outlet are provided adjacent to each other and extend entirely through the connector from an upper portion of the connector to a lower portion of the connector.

11. The heat exchanger according to claim 1, wherein the refrigerant inlet and the refrigerant outlet are provided at an upper portion of the core part and at one end of the core part in the stacking direction.

* * * * *